US009936643B1

(12) United States Patent
Kile

(10) Patent No.: US 9,936,643 B1
(45) Date of Patent: *Apr. 10, 2018

(54) HELICAL AUGER FLIGHT ASSEMBLIES AND THRESHER FORMED THEREWITH

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,948

(22) Filed: Sep. 21, 2017

Related U.S. Application Data

(63) Continuation of application No. 14/632,903, filed on Feb. 26, 2015, which is a continuation of application No. 14/024,391, filed on Sep. 11, 2013, now Pat. No. 8,979,623, which is a continuation-in-part of application No. 13/303,579, filed on Nov. 23, 2011, now Pat. No. 9,089,094.

(51) Int. Cl.
| | | |
|---|---|---|
| *A01F 12/00* | (2006.01) | |
| *A01F 12/10* | (2006.01) | |
| *A01F 12/46* | (2006.01) | |
| *A01D 41/12* | (2006.01) | |

(52) U.S. Cl.
CPC .............. *A01F 12/10* (2013.01); *A01D 41/12* (2013.01); *A01F 12/46* (2013.01)

(58) Field of Classification Search
CPC .......... A01F 12/10; A01F 12/46; A01F 12/00; A01F 7/06; A01F 7/062; A01F 7/065; A01F 7/067; A01F 7/04; E01H 5/098
USPC ........................................ 460/66–68; 56/14.6
See application file for complete search history.

(56) References Cited

U.S. PATENT DOCUMENTS

| | | | | |
|---|---|---|---|---|
| 3,572,346 A * | 3/1971 | Knapp et al. | ............. | A01F 7/06 460/68 |
| 3,586,004 A * | 6/1971 | De Pauw | .................. | A01F 7/06 460/68 |
| 3,621,850 A * | 11/1971 | Knapp et al. | ............. | A01F 7/06 460/121 |
| 3,828,794 A * | 8/1974 | Gochanour | ............. | A01F 12/00 460/68 |
| 3,982,549 A * | 9/1976 | De Pauw | ................ | A01F 12/20 460/67 |
| 4,248,248 A * | 2/1981 | De Busscher | .......... | A01F 12/22 460/68 |
| 4,250,896 A * | 2/1981 | Wagstaff | .................. | A01F 7/06 460/70 |

(Continued)

*Primary Examiner* — Thomas B Will
*Assistant Examiner* — Joan D Misa
(74) *Attorney, Agent, or Firm* — Michael W. Goltry; Robert A. Parsons; Parsons & Goltry

(57) ABSTRACT

A helical auger flight has an inner edge, an outer edge, an inner face, an outer face, and a leading extremity that includes a prominence and a leading edge that extends from the outer edge to the prominence. The prominence extends outward from the leading edge of the leading extremity to an outer end having an upturned jut. A wear plate is releasably connected to the inner face of the helical auger flight. The wear plate extends from the outer edge of the helical auger flight to the prominence. A front extremity of the wear plate extends forwardly of the leading edge of the helical auger flight so as to be in a shielding relationship with respect to the leading edge of the helical auger flight, and a nose of the front extremity of the wear plated is seated in direct contact against a contact surface of the jut.

4 Claims, 17 Drawing Sheets

(56) References Cited

U.S. PATENT DOCUMENTS

| | | | | |
|---|---|---|---|---|
| 5,145,462 A * | 9/1992 | Tanis | ............... | A01F 12/10 460/68 |
| 6,083,102 A * | 7/2000 | Pfeiffer | ............... | A01F 7/06 460/68 |
| 6,296,566 B1 * | 10/2001 | Tanis | ............... | A01F 12/10 460/68 |
| 6,688,970 B2 * | 2/2004 | Tanis | ............... | A01F 7/06 460/68 |
| 7,585,212 B2 * | 9/2009 | Tanis | ............... | A01F 7/06 460/67 |
| 8,079,899 B2 * | 12/2011 | Schwersmann | ............... | A01F 12/22 460/66 |
| 8,636,568 B1 * | 1/2014 | Farley | ............... | A01F 12/26 460/68 |
| 2005/0020329 A1 * | 1/2005 | Ricketts | ............... | A01F 12/10 460/70 |
| 2008/0058040 A1 * | 3/2008 | Buermann | ............... | A01F 7/067 460/66 |
| 2009/0011807 A1 * | 1/2009 | Becker | ............... | A01F 7/067 460/59 |

* cited by examiner

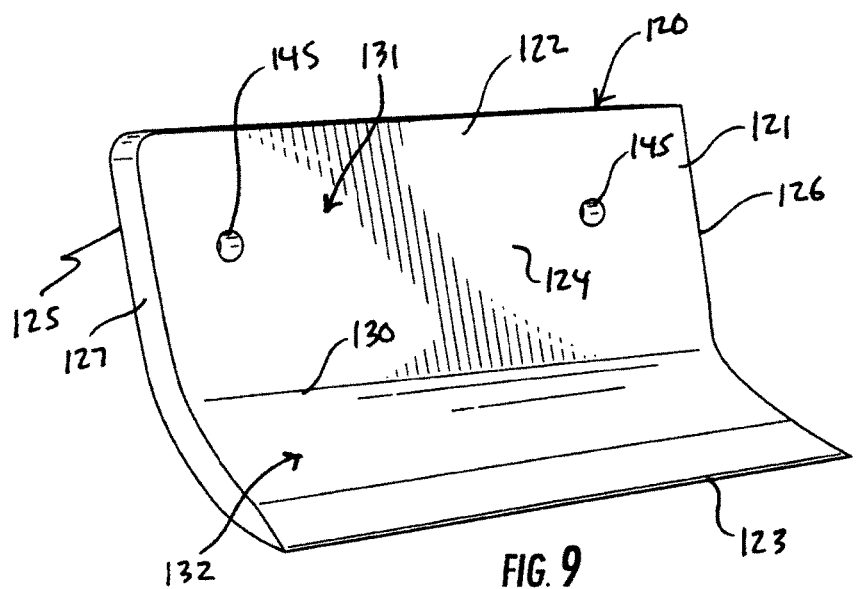
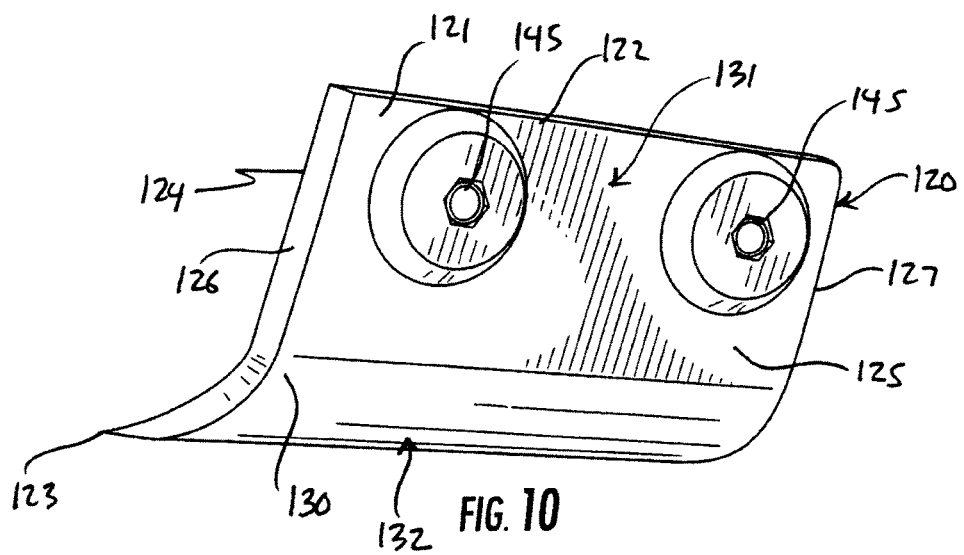

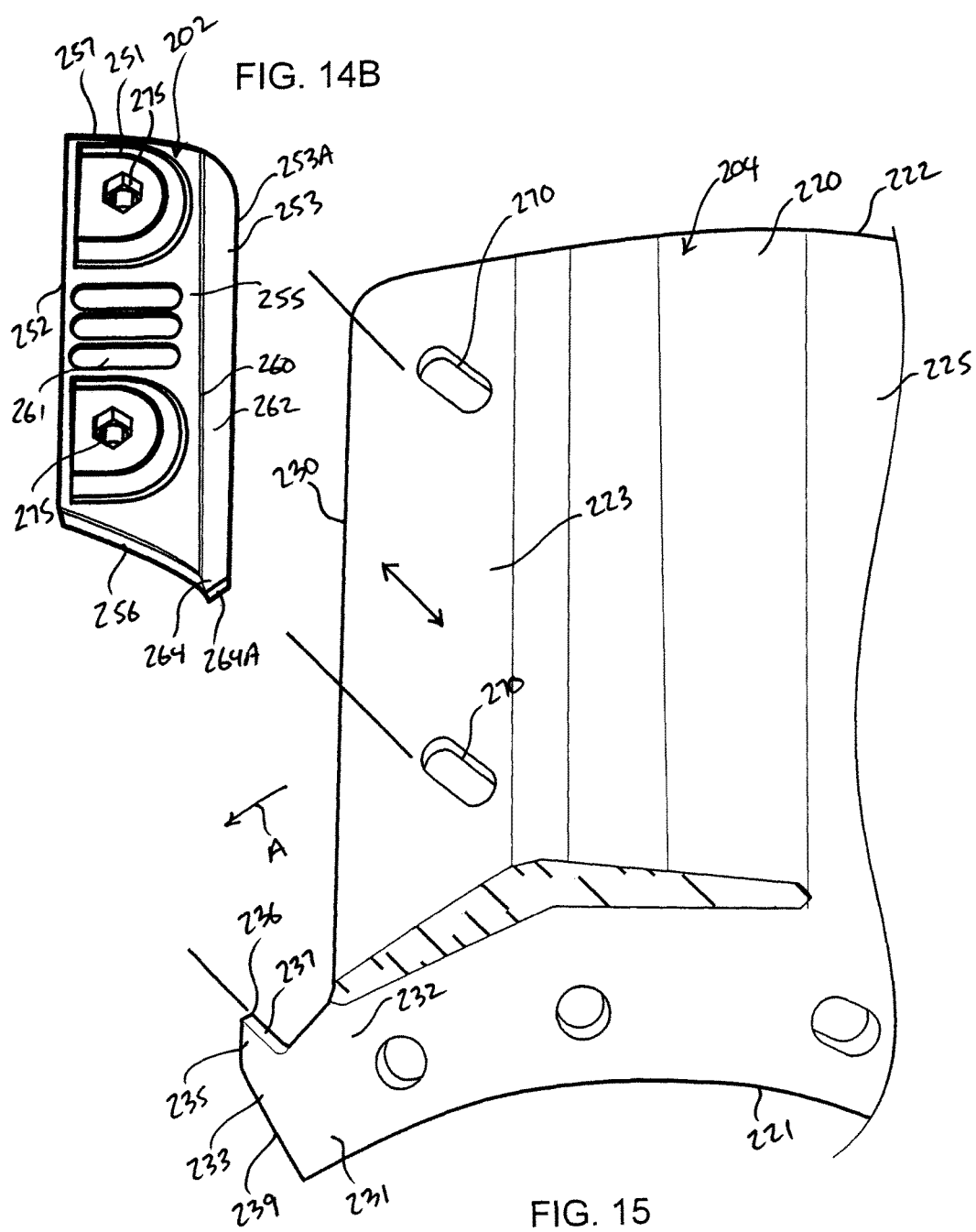

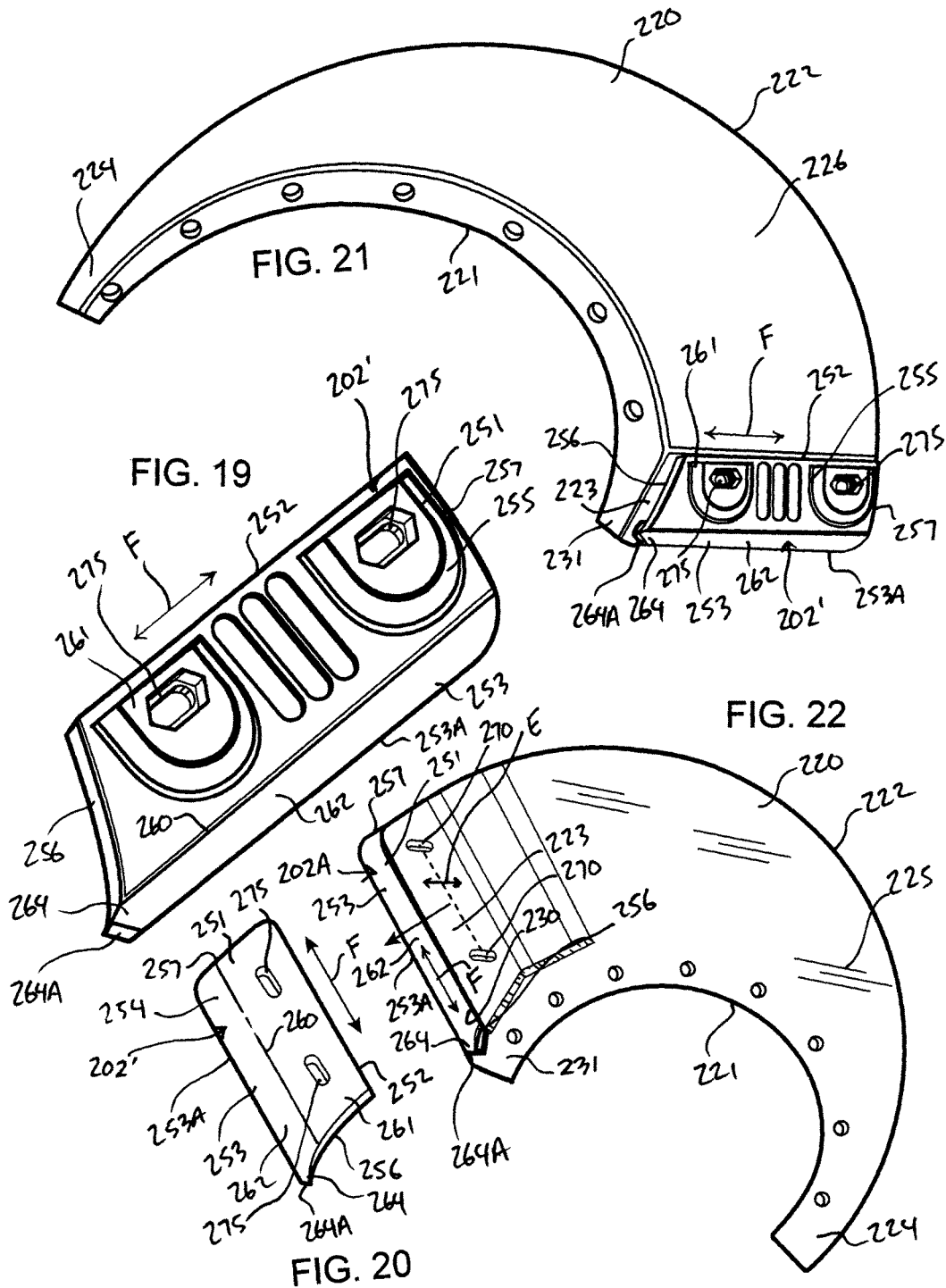

HELICAL AUGER FLIGHT ASSEMBLIES AND THRESHER FORMED THEREWITH

FIELD OF THE INVENTION

The present invention relates to combine harvesters and, more particularly, to threshers of combine harvesters.

BACKGROUND OF THE INVENTION

Agriculture is a major industry in the U.S., which is a net exporter of food. Presently there are approximately 2.2 million farms in the U.S. covering an area of approximately 920 million acres. Although in 1800 approximately ninety percent of the entire U.S. population was employed in agriculture, present day numbers have dropped to approximately two percent due largely to the development and implementation of large, automated agricultural equipment, such as combine harvesters, which have replaced large numbers of farm workers.

The crops grown in the U.S., such as wheat, barley, and rye, are only partly edible. While the seeds or grains at the top of each plant are edible and useful for making products such as bread and cereal, the rest of the plant, which is known as the chaff, is inedible and has to be discarded. Before modern-day machines were developed, such as in the 1800's, agricultural workers had to harvest crops by carrying out a series of laborious operations one after another. First they had to cut down the plants with a long-handled cutting tool such as a scythe. Next, they had to separate the edible grain from the inedible chaff by beating the cut stalks in an operation known as threshing. Finally, they had to clean any remaining debris away from the seeds to make them suitable for use in a mill. All this took a considerable amount of time and labor requiring large numbers of farm workers. The modern combine harvester carries out these various operations automatically eliminating the need for numerous farm workers.

In operation, a combine harvester is driven through a field of a growing crop, whereby the combine harvester cuts, threshes, and separates the grain from the chaff using rotating blades, wheels, sieves, and elevators. The grain collects in a tank inside the combine harvester, which is periodically emptied into tractors that drive alongside, while the chaff is ejected onto the field from an ejection spout at the back of the combine harvester.

In general, a combine harvester includes a header, a pickup reel, a cutter, a threshing drum, sieves, a collection tank, and conveyors, such as rotating belts and spinning augers. The header gathers the crop, and the pickup reel pushes the crop down toward the cutter, which cuts the crop at the base near ground level. A conveyor picks up the cuttings from the cutter, and conveys the cuttings to the threshing drum, which rotates and threshes the cuttings separating the grains from the chaff to form threshings, namely, the chaff and the separated grains. A conveyance conveys the threshings along the thresher from an upstream location of thresher to a downstream location of thresher as the thresher rotates and the grains fall through sieves into a collection tank inside the combine harvester, which is periodically emptied, such as into tractors that drive alongside, while a conveyor takes up and conveys the chaff to the ejection spout for ejection onto the field. Some combine harvesters have a rotating spreader mechanism that throws the chaff over a wide area, while others have bailers that bail the chaff for later use, such as for animal bedding.

Many threshing drums are formed with helical auger flights, which work to drive cuttings to the threshing drum for threshing. These auger flights forcibly rotate through the cuttings with the rotation of the threshing drum and are prone to substantial wear and damage, which necessitates regular flight repair or replacement. Repairing and replacing auger flights of threshing drums is expensive, time-consuming, and difficult, and results in costly downtime that most farmers simply cannot afford, thereby necessitating certain new and useful improvements in the art.

SUMMARY OF THE INVENTION

According to the principle of the invention, a combine harvester thresher includes a combine harvester threshing drum mounted for rotation in a threshing direction of rotation for threshing crop cuttings to form threshings. The threshing drum has a cylindrical exterior and a cuttings intake end. A helical auger flight is affixed to the cylindrical exterior of the threshing drum near the cuttings intake end of the threshing drum. The helical auger flight has a leading end directed into the threshing direction of rotation and an opposed trailing end directed away from the threshing direction of rotation, an outer face facing toward the cuttings intake end of the threshing drum and away from the threshing direction of rotation and an opposed inner face facing away from the cuttings intake end of the threshing drum and into the threshing direction of rotation for driving cuttings to the threshing drum for threshing from the cuttings intake end of the threshing drum in response to rotation of the threshing drum in the threshing direction of rotation. A sacrificial shield and wear plate is releasably attached to the leading end of the helical auger flight. The wear plate is for shielding the leading end of the helical auger flight from impacting cuttings and for deflecting cuttings away from the cuttings intake end of the threshing drum and to the inner face of the helical auger flight in response to rotation of the threshing drum in the threshing direction of rotation. The wear plate includes a body having an inner end and an opposed outer end, an outer surface and an opposed inner surface. The outer surface of the body of the wear plate near the inner end of the body of the wear plate is positioned alongside of the inner face of the helical auger flight near the leading end of the helical auger flight. The inner end of the wear plate is releasably attached to the leading end of the helical auger flight with releasable fasteners. The wear plate extends across the leading end of the helical auger flight, extends away from the leading end of the helical auger flight from the inner end of the wear plate releasably attached to the leading end of the helical auger flight to the outer end of the wear plate, and the outer end of the wear plate extends outwardly from the leading end of the helical auger flight, is located ahead of the leading end of the helical auger flight, and is angled toward the cuttings intake end of the threshing drum and away from the inner and outer faces of the helical auger flight, all for shielding the leading end of the helical auger flight from impacting cuttings in response to rotation of the threshing drum in the threshing direction of rotation. The inner surface of the wear plate includes a deflecting inner surface that extends outwardly from and ahead of the leading end of the helical auger flight to the outer end of the wear plate and is angled toward the cuttings intake end of the threshing drum and away from the inner and outer faces of the helical auger flight for deflecting cuttings away from the cuttings intake end of the threshing drum and to the inner face of the helical auger flight in response to rotation of the threshing drum in the threshing direction of rotation. The inner face of the helical auger flight is set at a first angle relative to the threshing direction of rotation of the threshing drum, the deflecting inner surface of the wear plate is set at a second angle relative to the threshing direction of rotation of the threshing drum, and the second angle is greater than the first angle. The body is a single one-piece unitary body formed of hardened steel or cast iron, and the fasteners each consist of a nut-and-bolt fastener.

According to the principle of the invention, a combine harvester thresher includes a combine harvester threshing drum mounted for rotation in a threshing direction of rotation for threshing crop cuttings to form threshings. The threshing drum has a cylindrical exterior and a cuttings intake end. A helical auger flight affixed to the cylindrical exterior of the threshing drum near the cuttings intake end of the threshing drum. The helical auger flight has a leading edge directed into the threshing direction of rotation and an opposed trailing end directed away from the threshing direction of rotation, an outer face facing toward the cuttings intake end of the threshing drum and away from the threshing direction of rotation and an opposed inner face facing away from the cuttings intake end of the threshing drum and into the threshing direction of rotation for driving cuttings to the threshing drum for threshing from the cuttings intake end of the threshing drum in response to rotation of the threshing drum in the threshing direction of rotation. The leading edge of the helical auger flight has opposed proximal and distal ends, wherein the proximal end is located near the cylindrical outer surface of the threshing drum, and the leading edge of the helical auger flight extends outwardly from the proximal end near the cylindrical outer surface of the threshing drum to the opposed distal end. The leading edge of the helical auger flight has a length extending from the proximal end of the leading edge to the distal end of the leading edge. A sacrificial shield and wear plate is releasably attached to the helical auger flight. The wear plate is for shielding the leading edge of the helical auger flight from impacting cuttings and for deflecting cuttings away from the cuttings intake end of the threshing drum and to the inner face of the helical auger flight in response to rotation of the threshing drum in the threshing direction of rotation. The wear plate includes a body having an inner end and an opposed outer end, an outer surface and an opposed inner surface. The outer surface of the body of the wear plate near the inner end of the body of the wear plate is positioned alongside the inner face of the helical auger flight near the leading edge of the helical auger flight. The inner end of the wear plate is releasably attached to the helical auger flight with releasable fasteners. The wear plate extends away from the leading edge of the helical auger flight from the inner end of the wear plate releasably attached to the helical auger flight to the outer end of the wear plate. The wear plate extends across and along the entire length of the leading edge of the helical auger flight from the proximal end of the leading edge to the distal end of the leading edge, and the outer end of the wear plate extends outwardly from the leading edge of the helical auger flight, is located ahead of the leading edge of the helical auger flight, and is angled toward the cuttings intake end of the threshing drum and away from the inner and outer faces of the helical auger flight, all for shielding the leading edge of the helical auger flight from impacting cuttings in response to rotation of the threshing drum in the threshing direction of rotation. The inner surface of the wear plate includes a deflecting inner surface that extends outwardly from and ahead of the leading edge of the helical auger flight to the outer end of the wear plate and is angled toward the cuttings intake end of the threshing drum and away from the inner and outer faces of the helical auger flight for deflecting cuttings away from the cuttings intake end of the threshing drum and to the inner face of the helical auger flight in response to rotation of the threshing drum in the threshing direction of rotation. The inner face of the helical auger flight is set at a first angle relative to the threshing direction of rotation of the threshing drum, the inner surface of the wear plate is set at a second angle relative to the threshing direction of rotation of the threshing drum, and the second angle is greater than the first angle. The body further is a single one-piece unitary body formed of hardened steel or cast iron, and the fasteners each consist of a nut-and-bolt fastener.

According to the principle of the invention, a combine harvester thresher includes a combine harvester threshing drum that is mounted for rotation in a threshing direction of rotation for threshing crop cuttings to form threshings. The threshing drum has a cylindrical exterior and a cuttings intake end. A helical auger flight includes a leading extremity, a trailing extremity, inner and outer edges that extend between the leading and trailing extremities, an inner face, and an outer face. The leading extremity includes a leading edge and a prominence near the inner edge of the helical auger flight. The prominence has an inner end and an outer end. The leading edge extends from the outer edge of the helical auger flight to the inner end of the prominence. The prominence extends outward from the leading edge of the leading extremity from the inner end to the outer end. The outer end of the prominence has an upturned jut that terminates distally at a tip. The jut has a contact surface that extends between the outer end of the prominence and the tip. The contact surface faces inwardly toward the leading edge. The outer end of the prominence further includes a forward edge that extends between the inner edge of the helical auger flight and the tip of the prominence. The helical auger flight is affixed to the cylindrical exterior of the threshing drum near the cuttings intake end of the threshing drum. The helical auger flight extends helically outward from the cylindrical exterior of the threshing drum from the inner edge to the outer edge, the leading extremity is directed into the threshing direction of rotation, the trailing extremity is directed away from the threshing direction of rotation, the outer face is directed forwardly toward the cuttings intake end of the threshing drum and away from the threshing direction of rotation, the inner face is directed rearwardly away from the cuttings intake end of the threshing drum and into the threshing direction of rotation for driving cuttings to the threshing drum for threshing from the cuttings intake end of the threshing drum in response to rotation of the threshing drum in the threshing direction of rotation. A wear plate has an upper extremity, a lower extremity, a rear extremity, and a front extremity. The front extremity has a front edge and a nose. The front extremity extends from the upper extremity and along the nose to the lower extremity of the wear plate. The wear plate is releasably connected to the inner face of the helical auger flight. The wear plate extends from the outer edge of the helical auger flight to the inner end of the prominence. The front extremity extends forwardly of the leading edge of the helical auger flight to the front edge so as to shield the leading edge of the helical auger flight from impacting cuttings and for deflecting cuttings rearwardly away from the cuttings intake end of the threshing drum in response to rotation of the threshing drum in the threshing direction of rotation. The nose of the wear plate is in direct contact against the contact surface of the jut, and the forward edge of the prominence and the front edge of the wear plate converge at the tip of jut and the nose of the wear plate, respectively, where the nose and the jut intersect. The wear plate is releasably connected to the helical auger flight with releasable fasteners. The releasable fasteners are applied to a first set of fastener openings through the helical auger flight and a second set of fastener openings through the wear plate. The fastener openings of first and second sets of fastener openings are each elongate. The fastener openings of the first set of fastener openings are each elongate in a first direction, and the fastener openings of the second set of fastener openings are each elongate in a second direction different from the first direction so as to permit adjustment of the wear plate in multiple directions. The first direction is parallel to the contact surface, and the second direction is oblique with respect to the first direction and parallel with respect to the leading edge of the helical auger flight.

According to the principle of the invention, a helical auger flight assembly includes a helical auger flight having a leading extremity, a trailing extremity, inner and outer edges that extend between the leading and trailing extremities, an inner face, and an outer face. The leading extremity includes a leading edge and a prominence having an inner end and an outer end. The leading edge extends from the outer edge of the helical auger flight to the inner end of the prominence. The prominence extends outward from the leading edge of the leading extremity from the inner end to the outer end. The outer end has an upturned jut that terminates distally at a tip. The jut has a contact surface that extends between the outer end of the prominence and the tip. The contact surface faces inwardly toward the leading edge. The outer end of the prominence further includes a forward edge that extends between the inner edge of the helical auger flight and the tip. A wear plate has an upper extremity, a lower extremity, a rear extremity, and a front extremity. The front extremity has a front edge and a nose and extends from the upper extremity to the lower extremity and therebeyond to the nose of the wear plate. The wear plate is releasably connected to the inner face of the helical auger flight. The wear plate extends from the outer edge of the helical auger flight to the inner end of the prominence, the front extremity extends forwardly of the leading edge of the helical auger flight to the front edge so as to be in a shielding relationship with respect to the leading edge of the helical auger flight, the nose of the wear plate is in direct contact against the contact surface of the jut, and the forward edge of the prominence and the front edge of the wear plate converge at the tip of jut and the nose of the wear plate, respectively, where the nose and the jut intersect. The wear plate is releasably connected to the helical auger flight with releasable fasteners. The releasable fasteners are applied to a first set of fastener openings through the helical auger flight and a second set of fastener openings through the wear plate. The fastener openings of first and second sets of fastener openings are each elongate. The fastener openings of the first set of fastener openings are each elongate in a first direction, and the fastener openings of the second set of fastener openings are each elongate in a second direction different from the first direction so as to permit adjustment of the wear plate in multiple directions. The first direction is parallel to the contact surface, and the second direction is oblique with respect to the first direction and parallel with respect to the leading edge of the helical auger flight.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings:

FIG. 9 is a front perspective view of a sacrificial shield and wear plate constructed and arranged in accordance with the principle of the invention;

FIG. 10 is a rear perspective view of the embodiment of FIG. 9;

FIG. 14B is a rear elevation view of the wear plate of FIGS. 14 and 14A;

FIG. 15 is an enlarged, fragmented view of a leading extremity of the helical auger flight that is shown detached from the thresher in FIG. 14;

FIG. 19 is a rear perspective view of an alternate embodiment of a sacrificial shield and wear plate constructed and arranged in accordance with the principle of the invention;

FIG. 20 is a front perspective view of the embodiment of FIG. 19;

FIG. 21 is a rear elevation view of the sacrificial shield and wear plate of FIGS. 19 and 20 shown as it would appear applied to a helical auger flight in preparation for installation; and FIG. 22 is a front elevation view of the embodiment of FIG. 21.

DETAILED DESCRIPTION

Figure 1:
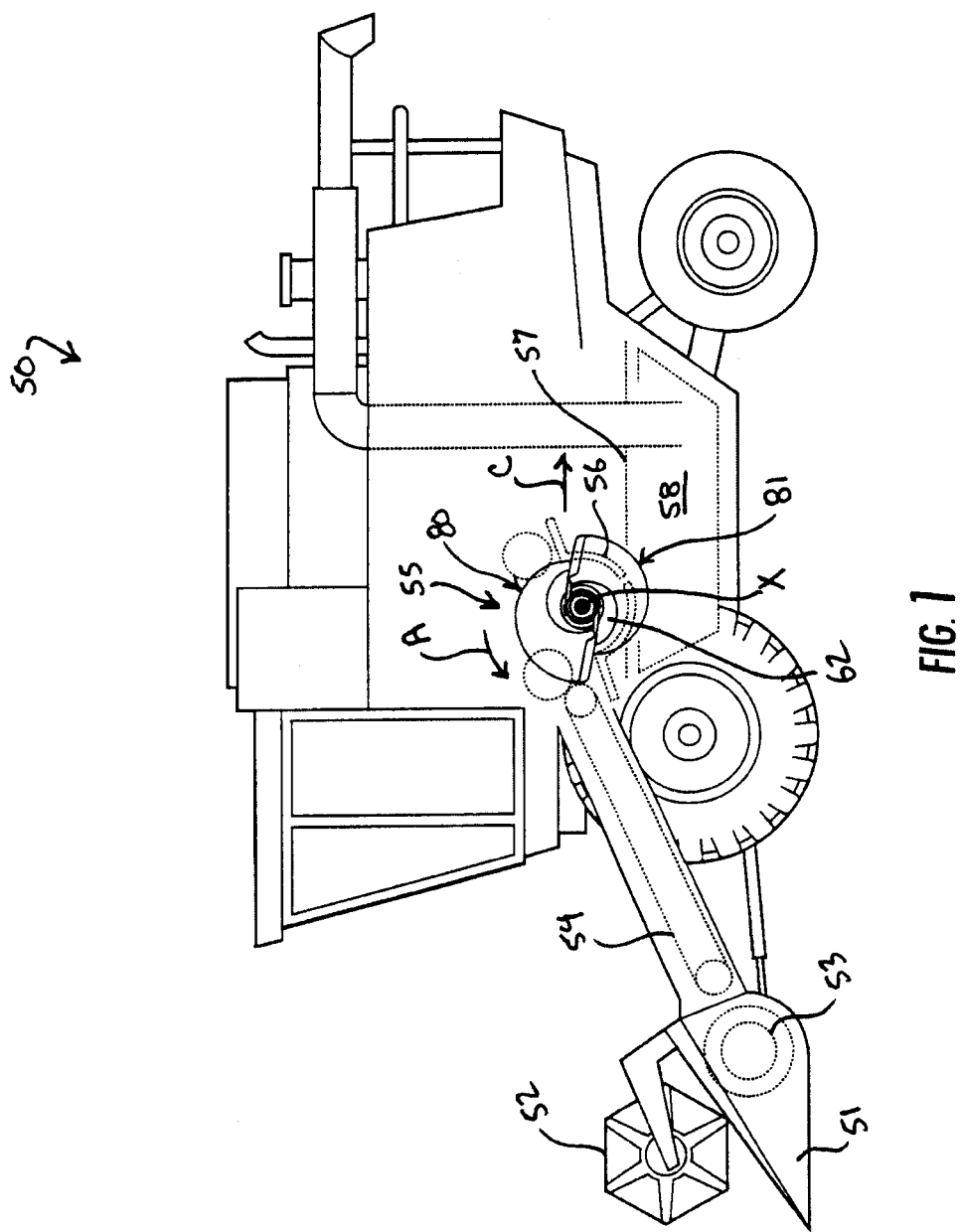
FIG. 1 is a highly generalized schematic representation of a combine harvester incorporating a thresher concave operatively positioned under a thresher consisting of a threshing drum formed with helical auger flights formed with sacrificial shield and wear plates constructed and arranged in accordance with the principle of the invention.

Turning now to the drawings, in which like reference characters indicate corresponding elements throughout the several views, attention is first directed to FIG. 1 in which there is seen a highly generalized schematic representation of a combine harvester 50 that, in general, includes a header 51, a pickup reel 52, a cutter 53, a thresher 55 operable for threshing crop cuttings to form threshings, a conveyer 54 formed between cutter 53 and thresher 55, a combine harvester concave or thresher concave 56 operatively positioned underneath thresher 55, sieves 57, a collection tank 58, and an array of conveyors, such as rotating belts and spinning augers. In the operation of combine harvester 50 as it is driven through a crop, header 51 gathers the crop, and pickup reel 52 pushes the crop to cutter 53, which cuts the crop at the base near ground level to form crop cuttings or, simply, cuttings. Conveyor 54 picks up the cuttings from cutter 53, and conveys the cuttings to thresher 55 for threshing. Thresher 55 is mounted for rotation and rotates relative to thresher concave 56 in a threshing direction of rotation generally indicated by arcuate arrowed line A about axis X of rotation of thresher 55 and threshes the cuttings along thresher concave 56 separating the grains from the chaff to form threshings, namely, the chaff and the separated grains. Specifically, conveyor 54 picks up the cuttings from cutter 53, and conveys the cuttings to a cuttings intake end 62 of thresher 55. Cuttings intake end 62 of thresher 55 is considered an upstream end of thresher 55. As thresher 55 rotates in the threshing direction of rotation A about axis X of rotation of thresher 55 and threshes the cuttings to form threshings, the threshings are moved along thresher 55 in a direction from cuttings intake end 62 of thresher 55 to a downstream location or end (not shown) of thresher 55, the grains formed by the threshing action of thresher 55 fall through sieves 57 into collection tank 58 inside combine harvester 50, which is periodically emptied, such as into tractors that drive alongside, while a conveyor takes up and conveys the chaff to an ejection spout for ejection onto the field. As described above, combine harvester 50 is exemplary of a typical combine harvester well known in the art, further details of which will readily occur to the skilled artisan and will not be discussed in further detail. Also, in FIG. 1 thresher 55 is mounted transversely with respect to the long axis of combine harvester 50. In the alternatively, thresher 55 can be mounted longitudinally with respect to the long axis of combine harvester 50.

Figure 2:
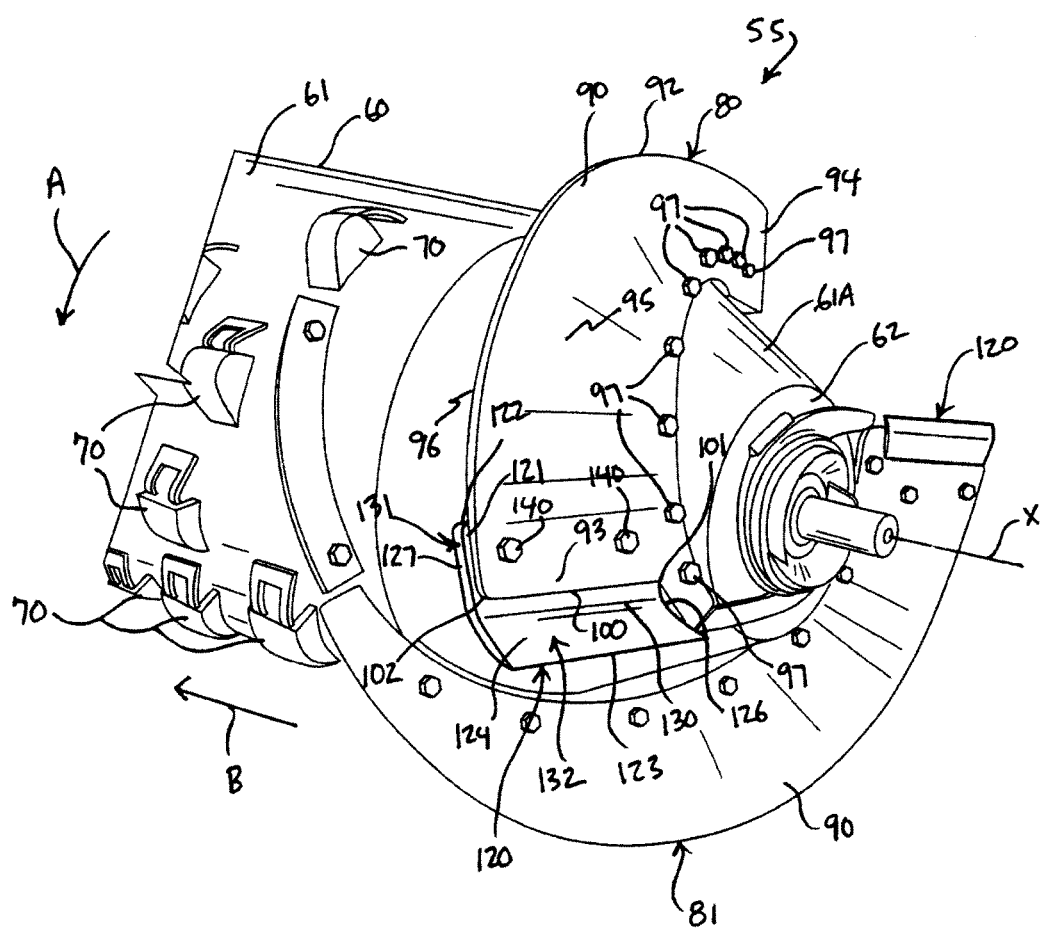
FIG. 2 is a fragmented perspective view of the thresher of FIG. 1 illustrating the helical auger flights formed with the sacrificial shield and wear plates constructed and arranged in accordance with the principle of the invention.
Figure 3:
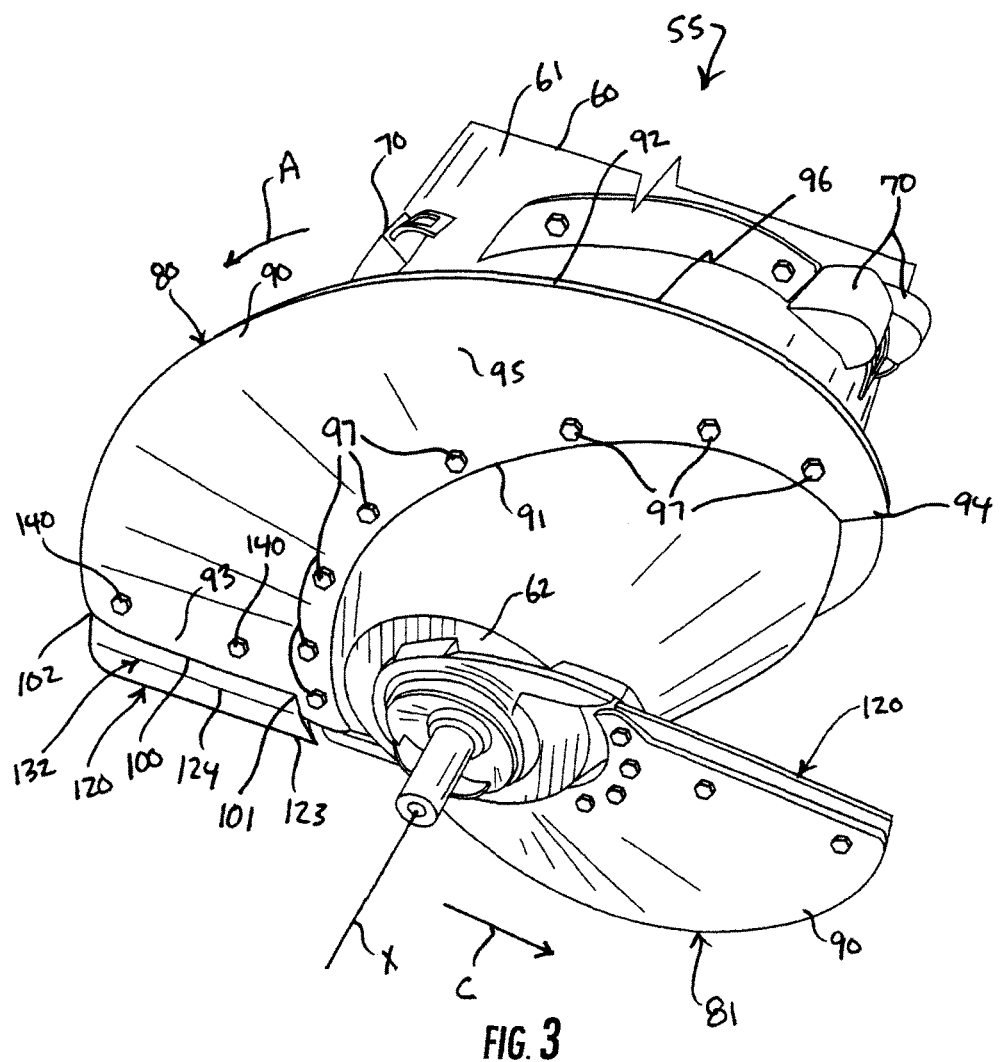
FIG. 3 is a view somewhat similar that of FIG. 2 illustrating the helical auger flights formed with the sacrificial shield and wear plates constructed and arranged in accordance with the principle of the invention.
Figure 4:
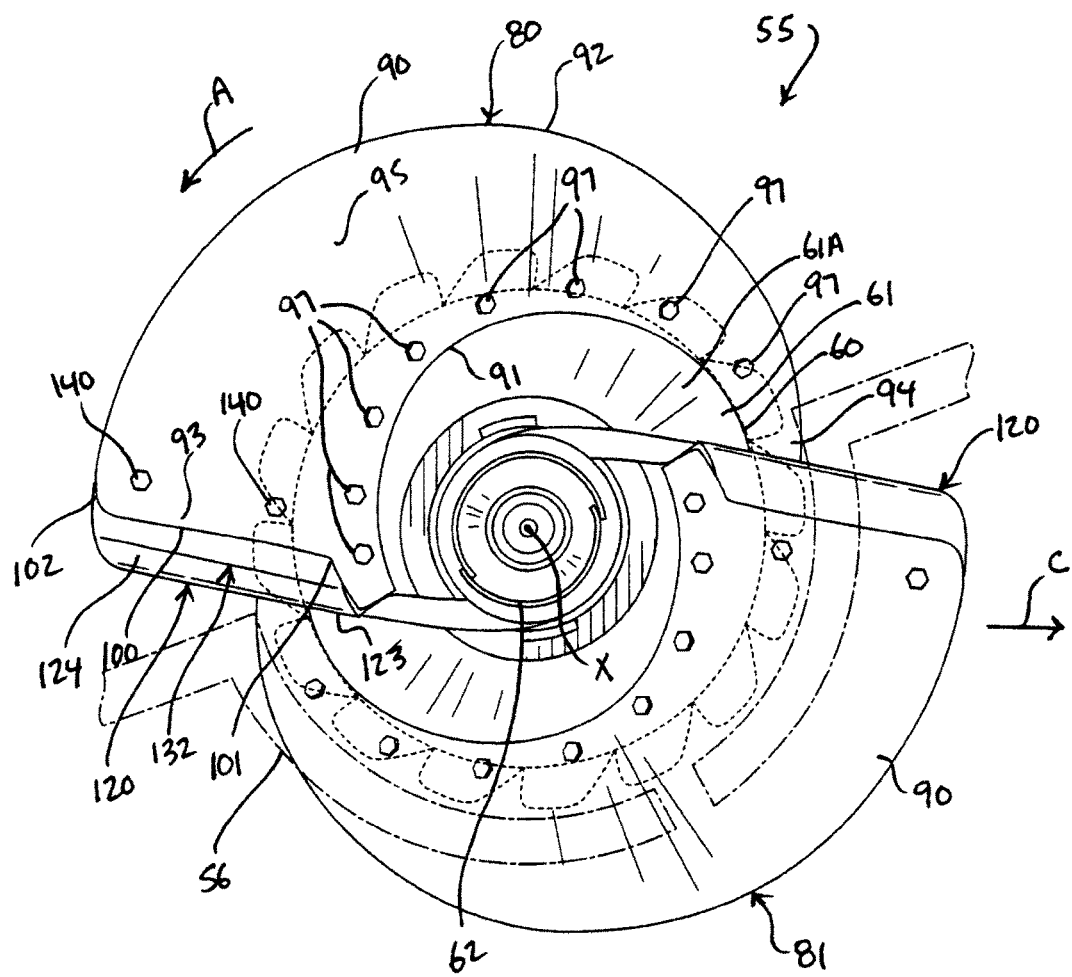
FIG. 4 is a partially schematic side elevation view of the thresher of FIG. 1 illustrating the helical auger flights formed with the sacrificial shield and wear plates constructed and arranged in accordance with the principle of the invention.

FIG. 2 is a fragmented perspective view of the thresher 55 of FIG. 1 illustrating segment of thresher 55 including cuttings intake end 62 of thresher 55. As shown in FIG. 2, thresher 55 includes a threshing drum 60 that, as explained above, is mounted for rotation in a conventional manner in threshing direction of rotation A about axis X of rotation of threshing drum 60 of thresher 55. Threshing drum 60 rotates about axis X of rotation. For clarity it is to be understood that axis X of rotation is not only the axis of rotation of thresher 55 but also the axis of rotation of threshing drum 60. As such, axis X of rotation is referred to interchangeably as being the axis of rotation of thresher 55 and also threshing drum 60 of thresher 55. Axis X of rotation X is perpendicular relative to the threshing direction of rotation A of threshing drum 60, and this orientation of axis X relative to threshing direction of rotation A of threshing drum 60 is best illustrated for reference purposes in FIG. 8.

Threshing drum 60 has a cylindrical outer surface or exterior 61, and a population of conventional threshing drum threshing rasps or bars 70 is affixed to cylindrical exterior 61 of threshing drum 60. Cylindrical exterior 61 has the customary frusto-conical segment or cone 61A extending outwardly to cuttings intake end 62, which is the narrowed end or outermost extremity of cone 61A. Diametrically opposed helical auger flights 80 and 81 are affixed to cone 61A of cylindrical exterior 61 of threshing drum 60 near cuttings intake end 62 of threshing drum 60. Arrowed line A indicates the direction of rotation of threshing drum 60 about axis X of rotation of threshing drum 60, which is the direction of rotation/travel of threshing rasps or bars 70 and also helical auger flights 80 and 81 affixed to threshing drum 60.

In response to rotation of threshing drum 60 in the threshing direction of rotation A about axis X of rotation, threshing rasps or bars 70 and helical auger flights 80 are driven so as to rotate in the threshing direction of rotation A about axis X of rotation of thresher 55. Threshing rasps or bars 70 are operable for threshing a crop applied between cylindrical exterior 61 of threshing drum 60 and thresher concave 56 illustrated in FIG. 1 in response to rotation of threshing drum 60 in the threshing direction of rotation A. And so in response to rotation of threshing drum 60 in the threshing direction rotation A about axis X of threshing drum 60, threshing bars 70 thresh the crop cuttings between cylindrical exterior 61 and thresher concave 56 illustrated in FIG. 1 separating the grains from the chaff to form threshings, namely, the chaff and the separated grains. In this threshing process, the threshings move along the rotating thresher 55 in a direction indicated generally by arrowed line B in FIG. 2 from cuttings intake end 62 of threshing drum 60 of thresher 55 to the downstream location or end (not shown) of thresher drum 60 of thresher 55, and the threshings subsequently are caused to be moved in the direction generally indicated by arrowed line C in FIG. 1 to sieves 57 and to collection tank 58, whereby the grains fall through sieves 57 into collection tank 58 inside combine harvester 50, which is periodically emptied, such as into tractors that drive alongside, while a conveyor takes up and conveys the chaff to an ejection spout for ejection onto the field. As threshing drum 60 rotates in the threshing direction of rotation A about axis X of threshing drum 60, conveyor 54 applies cuttings to cuttings intake end 62 of thresher drum 60 of thresher 55 and helical auger flights 80 and 81 forcibly rotate through the cuttings applied to cuttings intake end 62 of thresher drum 60 of thresher 55 and interact with and drive the cuttings to thresher drum 60 for threshing in the direction indicated by arrowed line B in FIG. 2. Helical auger flights 80 and 81 cooperate together as a cuttings intake or driving auger system or assembly that receives the cuttings and, in turn, applies the cuttings to thresher drum 60 for threshing from cuttings intake end 62.

For reference and understanding, FIG. 1 is exemplary of a highly generalized left side elevation view of combine harvester 50, and arrowed line A indicates a counterclockwise rotational direction of threshing drum 60 being the threshing direction of rotation A of thresher 55, including threshing rasps or bars 70 and helical auger flights 80 and 81. In the present example, threshing drum 60 is transverse relative to combine 50, and in an alternate embodiment threshing drum 60 is mounted longitudinally along the long axis of combine 50.

Helical auger flights 80 are identical to one another in every respect, and thresher 55 is configured with two opposed helical auger flights 80 and 81 in the present embodiment that together cooperate as a cuttings intake or driving auger system or assembly operable for picking up and driving cuttings in the direction of arrowed line B in FIG. 2 to thresher drum 60 of thresher 55 for threshing. Because helical auger flights 80 and 81 are identical to one another, the details of auger flight 80 will be discussed in detail, with the understanding that the ensuing discussion of helical auger flight 80 applies equally to helical auger flight 81. Also, because auger flights 80 and 81 are identical, they are referenced with common reference characters as is appropriate in conjunction with this specification.

Referencing FIGS. 2-5 in relevant part, helical auger flight 80 is a vane 90. Vane 90 consists of a single, unitary body fashioned of steel or other strong, rugged metal. Vane 90 is a thin, curved body that is made or otherwise caused to rotate about axis X in the threshing direction of rotation A in response to rotation of threshing drum 60 in the threshing direction of rotation A about axis X being the axis of rotation of threshing drum 60. Vane 90 is thin in that it is approximately ½-¾ of an inch thick. Vane 90 has an arcuate or curvilinear inner or lower edge 91 and an opposed arcuate or curvilinear outer or upper edge 92, a forward or leading extremity or end 93 an opposed rearward or trailing extremity or end 94, an outer face 95 and an opposed inner face 96, which is the working face of vane 90 in the nature of a cuttings driving face of vane 90 of flight 80. Vane 90 is elongate in that it has a length extending from leading end 93 to trailing end 94, and vane 90 has a width extending from lower edge 91 to upper edge 92. The width of vane 90 extending between lower edge 91 and upper edge 92 is not constant and has its greatest dimension at leading end 93 of vane 90 and its least dimension at trailing end 94 of vane 90. Furthermore, the width of vane 90 between lower edge 91 of vane 90 and upper edge 92 of vane 90 gradually tapers, i.e. becomes gradually smaller, from leading end 93 of vane 90 to trailing end 94 of vane 90.

Vane 90 is affixed to cone 61A of cylindrical exterior 61 near lower edge 91. Vane 90 is preferably affixed to cone 61A of cylindrical exterior 61 near lower edge 91 with releasable fasteners 97, which are preferably conventional nut-and-bolt fasteners. The nut-and-bolt fasteners 97 used to bolt vane 90 to cone 61A are applied at spaced intervals along the length of vane 90 from leading end 93 to trailing end 94, and are exemplary of releasable fasteners that releasably affix/connect vane 90 to cylindrical exterior 61 of threshing drum 60. Fasteners 97 are releasably secured between vane 90 near lower edge 91 of vane 90 and one or more flanges (not shown) formed on, and which form a part of, cone 61A of cylindrical exterior 61, and this is a common and well-known arrangement for securing helical auger flights to threshing drums, the details of which are well-known to those having ordinary skill and will not be discussed in further detail. The releasable attachment of vane 90 to cone 61A of cylindrical exterior with releasable fasteners 97 allows vane 90 to be removed when needed for repair, maintenance, or replacement, and this is well-known in the art.

Vane 90 extends outwardly from cone 61A from lower edge 91 at cone 61A of cylindrical exterior 61 of threshing drum 60 to upper edge 92, leading end 93 is directed forwardly into the threshing direction of rotation A, and opposed trailing end 94 is directed rearwardly away from the threshing direction of rotation A. Outer and inner faces 95 and 96 of vane 90 are parallel relative to each other. Outer face 95 of vane 90 faces outwardly toward cuttings intake end 62 of threshing drum 60 and away from the threshing direction of rotation A that is set at a constant oblique angle Ø1 (FIG. 8) relative to axis X of rotation of threshing drum 60. Inner face 96 of vane 90 faces away from cuttings intake end 62 of threshing drum 60 and into or otherwise toward the threshing direction of rotation A and is set at constant oblique angle Ø2 (FIG. 8) relative to axis X of rotation of threshing drum 60 and that is also set at a constant oblique angle of Ø3 (FIG. 8) relative to and facing the threshing direction of rotation A of threshing drum 60, which allows inner face 96 to encounter and drive cuttings to thresher drum 60 in the direction indicated by arrowed line B in FIG. 2 from cuttings intake end 62 of thresher drum 60 of thresher 55 in response to rotation of threshing drum 60 in the threshing direction of rotation A about axis X of rotation of threshing drum 60. Vane 90 is thus arranged in a helix relative to threshing drum 60, which means that it extends along a curve traced on cone 61A by the rotation of threshing drum 60 in the threshing direction of rotation A about axis X of rotation of threshing drum 60 crossing its right sections, i.e., its outer and inner faces 95 and 96, at constant oblique angles Ø1 and Ø2 (FIG. 8), respectively, relative to axis X of rotation of threshing drum 60. Angles Ø1 and Ø2 are equal to each other, and are each greater than the constant oblique angle Ø3 between inner face 96 of vane 90 and threshing direction of rotation A. In a preferred embodiment angles Ø1 and Ø2 are each 65 degrees, and angle Ø3 is 25 degrees. As vane 90 is arranged in a helix, in response to rotation of threshing drum 60 in the threshing direction of rotation A about axis X of threshing drum, vane 90 rotates in the threshing direction of rotation A about axis X of rotation of threshing drum 60 leading with leading end 93 and is driven leading end 93 first, and because inner face 96 is directed into the threshing direction of rotation A and faces the threshing direction of rotation A at angle Ø3 relative to threshing direction of rotation A and because angle Ø3 is less than angle Ø2 between inner face 96 and axis X of rotation of threshing drum 60, inner face 96 angularly helically encounters the cuttings so as to take up and drive the cuttings to thresher drum 60 for threshing in the direction indicated by arrowed line B in FIG. 2 away from cuttings intake end 62 of thresher drum 60 of thresher 55.

Leading end 93 of vane 90 is characterized in that it has a leading edge 100 directed into the threshing direction of rotation A. Leading edge 100 is part of leading end 93. Leading edge 100 is elongate and straight and has opposed proximal and distal ends 101 and 102. Proximal end 101 is located near cone 61A of cylindrical exterior 61 of threshing drum 60, and leading edge 100 of vane 90 of flight 80 extends outwardly from proximal end 101 near cone 61A of cylindrical exterior 61 of threshing drum 60 to opposed distal end 102 that meets, and is in contact with, upper edge 92 of vane 90. Leading edge 100 has a length extending from proximal end 101 of leading edge 101 to distal end 102 of leading edge 100. Leading edge 100 of leading end 93 of vane 90 is directed into the threshing direction of rotation A of threshing drum 60.

Because vane 90 of flight 80 leads with leading end 93, leading end 93, including leading edge 100 of leading end 93, is susceptible to damage and wear in response to impacting cuttings in response to rotation of threshing drum 60 about axis X in the threshing direction of rotation A, which requires vane 90 to be repeatedly repaired or replaced to ensure proper or desired operation as leading end 93, including leading edge 100, becomes worn and damaged. To solve these problems and to prevent premature wear and damage to leading end 93 of vane 90 of flight 80, including leading edge 100 of vane 90 of flight 80, a sacrificial shield and wear plate 120 is releasably attached/connected to leading end 93 of vane 90 of flight 80 so as to form a flight assembly consisting of wear plate 120 releasably or otherwise removably attached/connected to vane 90. Wear plate 120 is applied between leading end 93 of vane 90 and threshing direction of rotation A of threshing drum 60 so as to be in a shielding relationship relative to leading edge 100 of leading end 93 to shield leading end 93, including leading edge 100, of vane 90 of flight 80 from impacting cuttings and to also deflect cuttings away from cuttings intake end 62 of threshing drum 60 and to inner face 96 of vane 90 of flight 80 in response to rotation of threshing drum 60 in the threshing direction of rotation A about axis X of rotation of threshing drum 60.

Referencing FIGS. 9 and 10 in relevant part, wear plate 120 consists of a body 121 that is a single, one-piece unitary body formed by machining or forging or molding, and which is preferably formed of hardened metal, such as preferably conventional hardened steel or cast iron. Body 121 has an inner or rear end 122 and an opposed outer or front end 123, an outer surface 124 and an opposed inner surface 125, an inner or lower edge 126 and an opposed outer or upper edge 127 that each extend between inner and outer ends 122 and 123. Inner or lower edge 126 is at the inner or lower extremity of body 121, and outer or upper edge 127 is at the outer or upper extremity of body 121. Body 121 has a width that extends from inner end 122 to outer end 123, and body 121 has a length that extends from inner edge 126 to outer edge 127. Inner end 122 is parallel with respect to outer end 123, and outer end 123 is characterized in that it is a narrowed or sharpened cutting edge that extends along the entire length of body 121 from inner edge 126 to outer edge 127. Like vane 90, body 121 of wear plate 120 is approximately ½-¾ of an inch thick.

Body 121 is formed with a transverse bend denoted at 130. Bend 130 is located at an intermediate location between inner end 122 and outer end 123, and extends along the entire length of body 121 from inner edge 126 to outer edge 127. Bend 130 is parallel with respect to inner and outer ends 122 and 123 of body 121 and divides body 121 into two main angularly offset sections or extremities, including an inner or rear section or extremity of body 121 that extends from inner end 122 to bend 130 and which is denoted generally at 131, and an outer or front section or extremity of body 121 that extends from bend 130 to outer end 123 and which is denoted generally at 132. At bend 130, body 121 is bent outwardly, namely, toward outer surface 124 and away from inner surface 125 such that body 121 is outwardly bent toward outer surface 124 and away from inner surface 125. Front extremity 132 is, thus, bent outwardly relative to rear extremity 131 such that front extremity 132 is outwardly, angularly disposed relative to rear extremity 131. Outer and inner surfaces 124 and 125 extending along rear extremity 131 of wear plate 120 are parallel relative to each other, and outer and inner surfaces 124 and 125 extending along front extremity 132 of wear plate 120 are parallel relative to each other. Outer and inner surfaces 124 and 125 are each contiguous, which means that outer surface 124 of rear extremity 131 of wear plate 120 meets and is in contact with outer surface 124 of front extremity 132 of wear plate 120, and inner surface 125 of rear extremity 131 of wear plate 120 meets and is in contact with inner surface 125 of front extremity 132 of wear plate 120.

Figure 5:
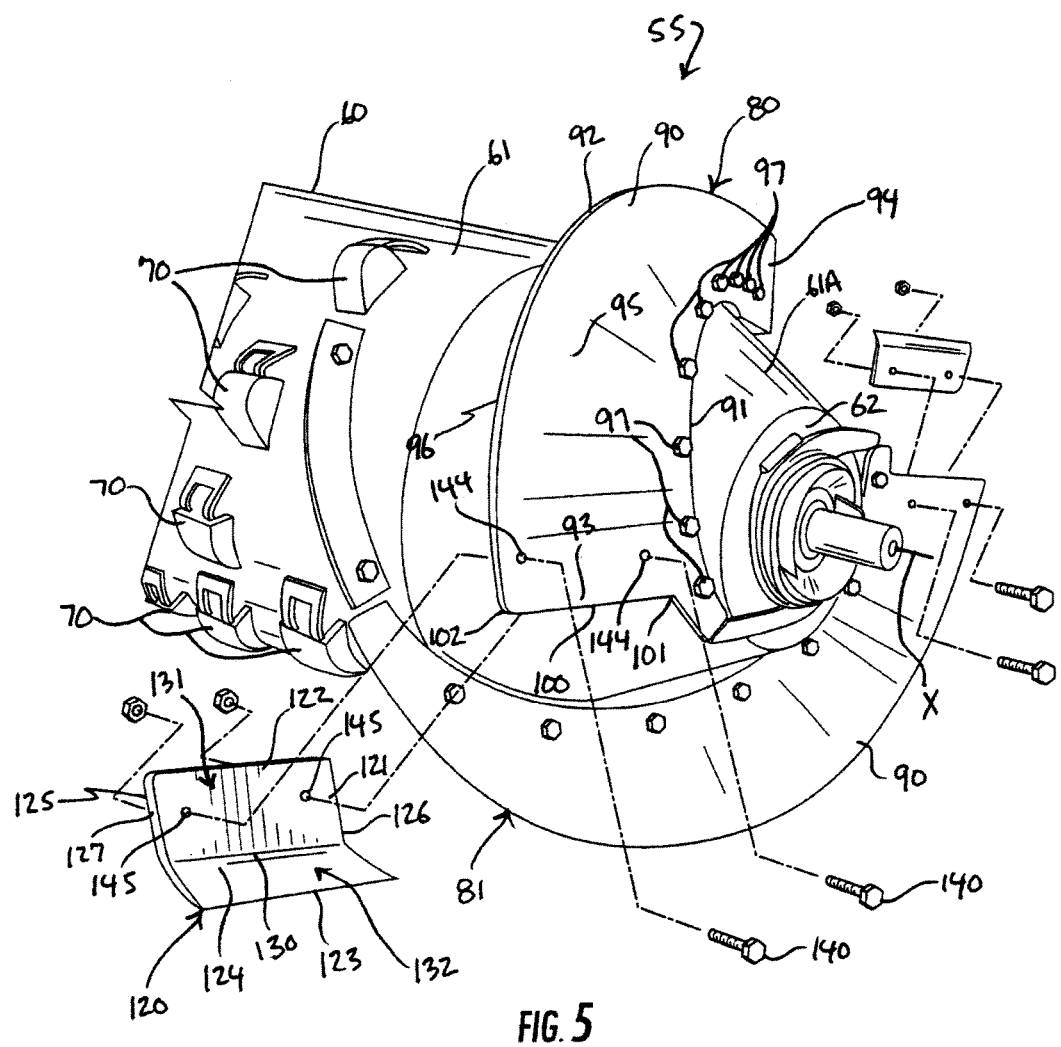
FIG. 5 is a perspective view similar to that of FIG. 2 illustrating the sacrificial shield and wear plates in explosion view with respect to the helical auger flights.

FIGS. 2-8 illustrate wear plate 120 as it would appear installed with or otherwise affixed to leading end 93 of vane 90 so as to form a helical auger flight assembly according to the principle of the invention. Wear plate 120 is preferably affixed to vane 90 with releasable fasteners 140 illustrated in FIGS. 2-7, which are preferably conventional nut-and-bolt fasteners. The nut-and-bolt fasteners 140 are spaced apart from one another, are applied and secured between wear plate 120 and vane 90 near leading edge 100 of leading end 93 of vane 90 so as to bolt wear plate 120 to vane 90. Fasteners 140 are exemplary of releasable fasteners that releasably affix/connect wear plate 120 to vane 90. The releasably attachment of wear plate 120 to vane 90 with nut-and-bolt fasteners 140 allows wear plate 120 to be easily attached and as shown in FIG. 5, and readily and non-destructively removed for repair, maintenance, or replacement. According to the principle of the invention, wear plate 120 shields leading end 93 and leading edge 100 of vane 90 of flight 80 from impacting cuttings and takes the brunt of cuttings impact, and is structured to deflect cuttings away from the cuttings intake end 62 of the threshing drum and to inner face 96 of vane 90 of flight 80 in response to rotation of threshing drum 60 in threshing direction of rotation A about axis X of rotation of threshing drum 60.

Figure 7:
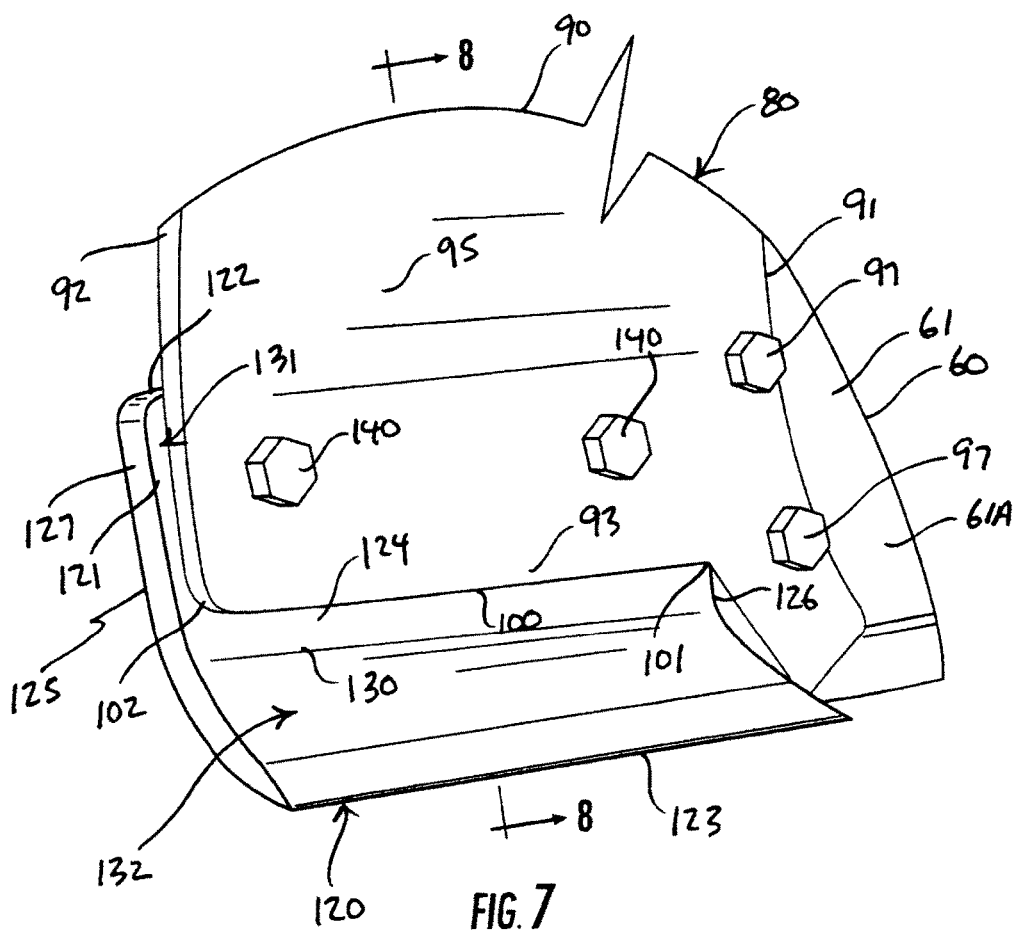
FIG. 7 is another enlarged fragmented perspective view of the embodiment of FIG. 6.
Figure 8:
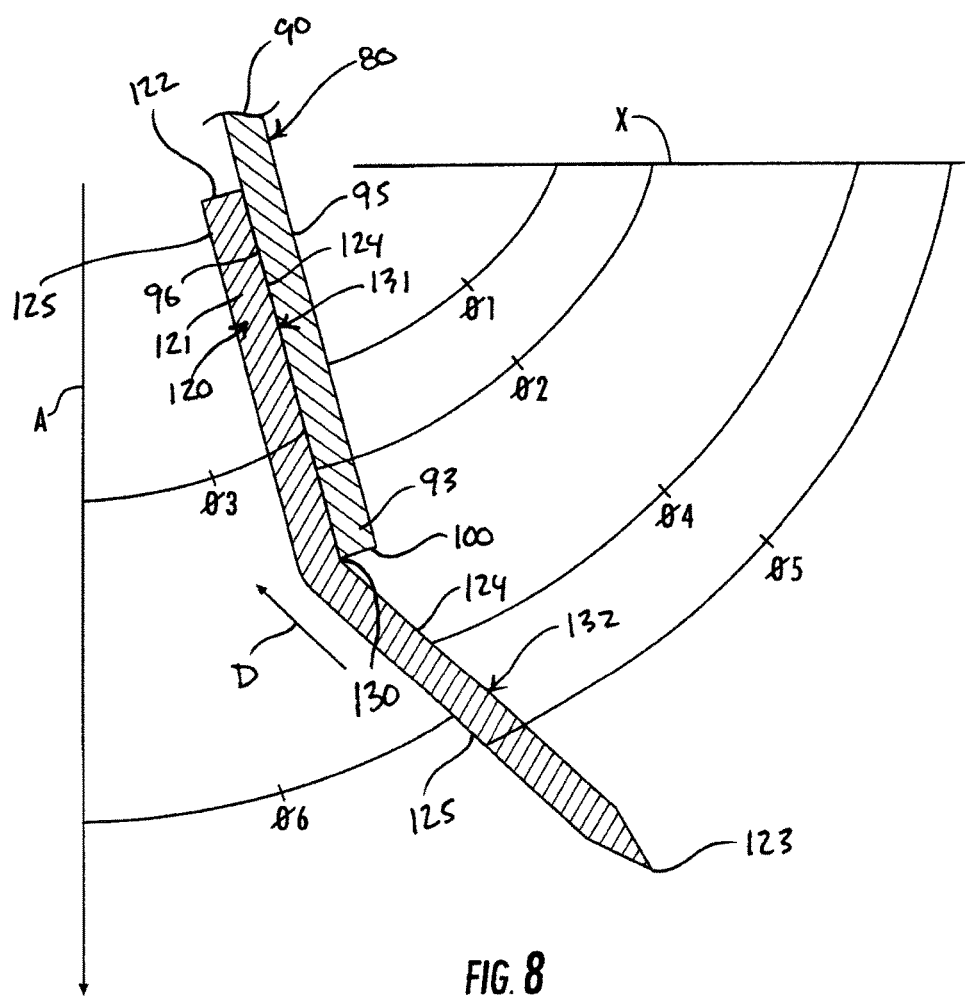
FIG. 8 is a section view taken along line 8-8 of FIG. 7.

In the installation of wear plate 120 onto vane 90 of flight 80 with reference in relevant part to FIGS. 7 and 8, outer surface 124 of rear extremity 131 of body 121 of wear plate 120 near inner end 122 of wear plate 120 extending between bend 130 and inner end 122 of body 121 of wear plate 120 is positioned alongside of and against so as to be in contact with inner face 96 of vane 90 of flight 80 near leading end 93 and leading edge 100 of vane 90 of flight 80. Body 1210 is positioned such that inner and outer ends 122 and 123 and bend 130 are parallel with respect to leading edge 100 of leading end 93 of vane 90, and outer surface 124 of rear extremity 131 of wear plate 120 extends downwardly along inner face 96 of vane 90 from inner end 122 of wear plate 120 to bend 130 at leading edge 100 of leading end 94 of vane 90. Bend 130 is located under leading end 93 edge 100 of leading end 93 of vane 90.

The length of body 121 of wear plate 120 extending from inner edge 126 to outer edge 127 of body 121 of wear plate 120 is chosen such that it is 2-5 percent greater than the length of leading edge 100 of leading end 93 of vane 90 of flight 80 extending from proximal end 101 of leading edge 100 to distal end 102 of leading edge 100. Body 121 of wear plate 120 is further specifically positioned so as to locate inner edge 126 of body 121 of wear plate 120 at proximal end 101 of leading edge 100 of leading end 93 of vane 90 and this is clearly shown in FIG. 7. And so with wear plate 120 positioned or otherwise oriented such that inner and outer ends 122 and 123 and bend 130 of wear plate 120 are parallel with respect to leading edge 100 of leading end 93 of vane 90, body 121 of wear plate 120 thus extends along the entire length of leading edge 100 of leading end 93 of vane 90 from inner edge 126 of wear plate at proximal end 101 of leading edge 100 of vane 90, to outer edge 127 of wear plate 120 at distal end 102 of leading edge 100 of leading end 93 of vane 93. Moreover, because the length of body 121 of wear plate 120 extending from inner edge 126 to outer edge 127 of body 121 of wear plate 120 is chosen such that it is greater than the length of leading edge 100 of leading end 93 of vane 90 of flight 80 extending from proximal end 101 of leading edge 100 to distal end 102 of leading edge 100, body 121 of wear plate 120 extends outwardly from or otherwise outboard of distal end 102 of leading edge 100 of leading end 93 of vane 90 to outer edge 127 of wear plate 120, which projects outwardly from or otherwise outboard of distal end 102 of leading edge 100 of leading end 93 of vane 90 and also upper edge 92 of vane 90 as shown in FIG. 7.

According to the described positioning of wear plate 120 relative to and along leading end 93 of vane 90 of flight 80, wear plate 120 extends across leading end 93 of vane 90 across the entire length of leading edge 100 and leading end 93 of vane 90 of flight 80 from proximal end 101 end of leading edge 100 to distal end 102 of leading edge 100, and front extremity 132 of body 121 of wear plate 120 extends away from bend 130 of body 121 of wear plate 120 and leading edge 100 of leading end 93 of vane 90 of flight 90 to outer end 123 of body 121 of wear plate 120. This installation of wear plate 120 locates wear plate 120 in a shielding relationship, which is between leading end 93 and leading edge 100 of vane 90 and threshing direction of rotation A causing inner surface 125 of wear plate 120 extending along inner and outer sections 131 and 132 and facing into threshing direction of rotation A to take the brunt of cuttings impact in response to rotation of threshing drum 60 in the threshing direction of rotation A about axis X of threshing drum 60 and thereby protect and shield leading end 93 and leading edge 100 of vane 90 from impacting cuttings in response to rotation of threshing drum 60 in the threshing direction of rotation A about axis X of threshing drum 60. Because body 121 is bent outwardly at bend 130 toward outer surface 124 of wear plate 120 and away from inner surface 125 of wear plate 120 such that front extremity 132 of wear plate 120 is bent outward relative to rear extremity 131 of wear plate 120 as described above, because outer surface 124 of rear extremity 131 of body 121 of wear plate 120 near inner end 122 of wear plate 120 extending between bend 130 and inner end 122 of body 121 of wear plate 120 is positioned alongside of and against so as to be in contact with inner face 96 of vane 90 of flight 80 near leading end 93 and leading edge 100 of vane 90 of flight 80, because body 1210 is positioned such that inner and outer ends 122 and 123 and bend 130 are parallel with respect to leading edge 100 of leading end 93 of vane 90 and because outer surface 124 of rear extremity 131 of wear plate 120 extends downwardly along inner face 96 of vane 90 from inner end 122 of wear plate 120 to bend 130, which is located under and outboard of leading edge 100 of leading end 93 of vane 90, front extremity 132 of wear plate 120 extends outwardly from leading edge 100 of leading end 92 of vane 90, is located ahead of or otherwise outboard of leading edge 100 of leading end 93 of vane 90, and is angled away from leading end 93 and from leading edge 100 of vane 90 and also from outer and inner faces 95 and 96 of vane 90 toward cuttings intake end 62 of threshing drum 60 as shown in FIG. 2. With this shielding positioning of wear plate 120 relative to leading end 93 of vane 90, wear plate 120 is then releasably affixed to vane 90 via bolting with releasable fasteners 140, which are preferably conventional nut-and-bolt fasteners as previously described. The nut-and-bolt fasteners 140 used to bolt wear plate 120 to vane 90 are spaced apart from one another, are secured between rear extremity 131 of wear plate 120 and vane 90 near leading edge 100 of leading end 93 of vane 90, and are exemplary of releasable fasteners that releasably affix wear plate 120 to vane 90. Again, the releasably attachment of wear plate 120 to vane 90 with fasteners 140 allows wear plate 120 to be non-destructively removed for repair, maintenance, or replacement.

Figure 6:
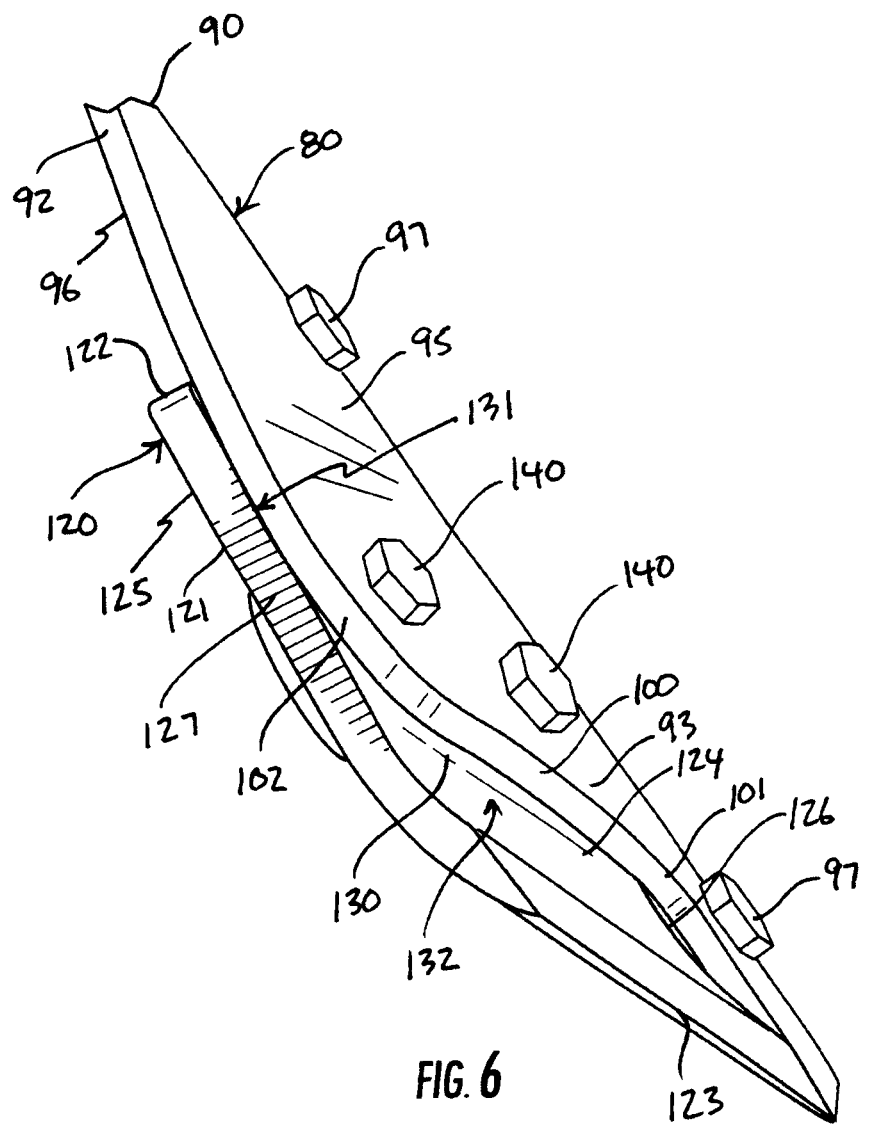
FIG. 6 is an enlarged fragmented perspective view of a leading end of one of the helical flights of the thresher of FIG. 1 and show as it would appear with an attached sacrificial shield and wear plate constructed and arranged in accordance with the principle of the invention.

Referencing FIG. 6, vane 90 is formed with fastener openings 144 near leading edge 100 of leading end 93 of vane 90, and rear extremity 131 of wear plate 120 is formed with corresponding fastener openings 145 between bend 130 and inner end 122. Fastener openings 145 of wear plate 120 correspond to and align with fastener openings 144 of vane 90, which concurrently receive fasteners 140 to releasably secure wear plate 120 to vane 90. Fastener openings 145 formed in wear plate 120 correspond to fastener openings formed in vane 90 such that when aligned and fitted with fasteners 140 releasably affixing wear plate 120 to vane 90 produce the specific positioning of wear plate 120 relative to vane 90 as discussed in detail above.

Referencing FIGS. 2 and 8 in relevant part, with wear plate 120 installed and affixed in place with vane 90 as discussed in detail above, front extremity 132 and outer and inner surfaces 124 and 125 thereof extend angularly outwardly from leading edge 100 of leading end 93 of vane 90 to outer end 123 of wear plate 120 toward cuttings intake end 62 of threshing drum 60 as shown in FIG. 2. Outer surface 124 of front extremity 132 faces outwardly toward cuttings intake end 62 of threshing drum 60 and away from the threshing direction of rotation A and is set at a constant oblique angle Ø4 relative to axis X of rotation of threshing drum 60. Inner surface 125 of front extremity 132 faces away from cuttings intake end 62 of threshing drum 60 and faces into the threshing direction of rotation A and is set at a constant oblique angle Ø5 relative to axis X of rotation of threshing drum 60 and is also set at a constant oblique angle Ø6 relative to threshing direction of rotation A. Angles Ø4 and Ø5 are equal to one another in this example, are each less than each of angles Ø1 and Ø2 in this example, and are each greater than angle Ø3 and also angle Ø6 in this example. Angle Ø6 between inner surface 125 of front extremity 132 and threshing direction of rotation A is greater than angle Ø3 between inner face 96 of vane 90 and threshing direction of rotation A and is less than angles Ø1 and Ø2, and inner surface 125 of front extremity 132 of wear plate 120 is, and functions, as a cuttings deflecting inner surface of wear plate 120 for not only shielding leading edge 100 and leading end 93 of vane 90 from impacting cuttings in response to rotation of threshing drum about axis X in the threshing direction of rotation A, but also deflecting cuttings along inner surface 125 of lower section 132 of wear plate 120 from threshing drum 60 in the direction indicated by arrowed line B in FIG. 2 toward inner face 96 of vane 90 in response to rotation of threshing drum 60 in the threshing direction of rotation A placing the cuttings in the path of the oncoming inner face 96 of vane 90 for allowing the cuttings to be driven by and along inner face 96 of vane 90 to threshing drum 60 of thresher 55 for threshing in the direction of arrowed line B in FIG. 2. In a preferred embodiment as explained above, angles Ø1 and Ø2 are each 65 degrees, and angle Ø3 is 25 degrees. Further to a preferred embodiment, angles Ø4 and Ø5 are each 55 degrees, and angle Ø6 is 35 degrees.

It is to be emphasized that in response to rotation of threshing drum 60 in the threshing direction of rotation A about axis X of threshing drum 60, flight 90 leads with wear plate 120 releasably affixed to leading end 93 shielding and protecting leading end 93 and leading edge 100 of vane 90 from impacting cuttings, in which outer end 123 of wear plate 120 cuts into the cuttings so as to cut them further, inner surface 125 of front extremity 132 of wear plate 120 deflects cuttings to inner face 96 of flight 90 for driving the cuttings to thresher drum 60 for threshing in the direction of arrowed line B in FIG. 2. Furthermore, because inner surface 125 of wear plate 120 is directed into the threshing direction of rotation A of threshing drum 60, the entirety of inner surface 125 of wear plate 120 extending from inner end 122 of wear plate 120 to outer end 123 of wear plate takes the full brunt of cuttings impact protecting leading end 93 and leading edge 100 of vane 90 from wear and damage. Should wear plate 120 become damaged or worn, it may be easily removed for repair or replacement without having to replace vane 90 of flight 80.

As seen in FIGS. 2-5, flights 80 and 81 are arranged leading end 93 with attached wear plate 120 to trailing end 94, and are offset relative to each other and diametrically oppose one another. Flights 80 and 81 operate identically to one another as fully described in connection with flight 80, and flights 80 and 81 are sized to fully encircle cone 61A of cylindrical exterior 61 of threshing drum causing them to cooperate to form a cuttings intake or driving auger system or assembly that forcibly rotates through the cuttings applied to cuttings intake end 62 of thresher drum 60 of thresher 55 and forcibly takes up and drives the cuttings to thresher drum 60 of thresher 55 in the direction of arrowed line B in FIG. 2 for threshing in response to rotation of threshing drum 60 in the threshing direction of rotation A about axis X of threshing drum 60. Although threshing drum 60 incorporates two flights 80 and 81, more can be used if so desired without departing from the invention.

Figure 11:
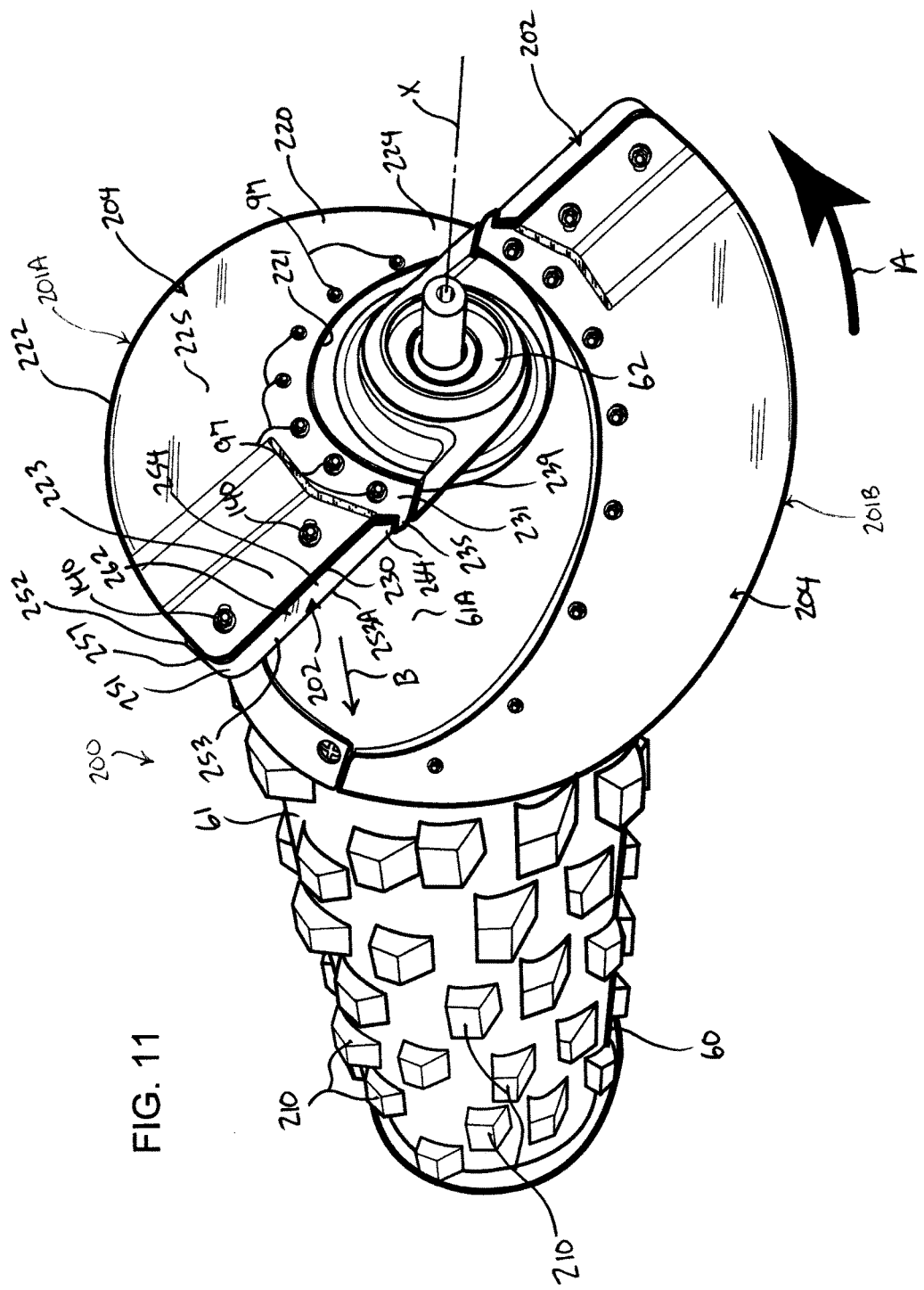
FIG. 11 is a perspective view of a thresher incorporating helical auger flight assemblies constructed and arranged in accordance with the principle of the invention, the helical auger flight assemblies each including an alternate embodiment of a sacrificial shield and wear plate affixed to an alternate embodiment of a helical auger flight.

Reference is now directed to FIG. 11, which is a perspective view of a thresher 200 incorporating helical auger flight assemblies 201 constructed and arranged in accordance with the principle of the invention. Helical auger flight assemblies 201 each include an alternate embodiment of a sacrificial shield and wear plate 202 releasably connected/affixed to an alternate embodiment of a helical auger flight 204. In common with previously-described thresher 55, thresher 200 shares threshing drum 60, cylindrical exterior 61, and cuttings intake end 62, and is operable for threshing crop cuttings to form threshings. As described in conjunction with thresher 55, identically thresher 200 is mounted within the combine harvester (not shown) for rotation and rotates relative to a thresher concave (not shown) in threshing direction of rotation generally indicated by arcuate arrowed line A about axis X of rotation of thresher 200 and threshes the cuttings along a thresher concave (not shown) separating the grains from the chaff to form threshings, namely, the chaff and the separated grains. Specifically, cuttings are applied to cuttings intake end 62 of thresher 200. Cuttings intake end 62 of thresher 200 is considered an upstream end of thresher 200. As thresher 200 rotates in the threshing direction of rotation A about axis X of rotation of thresher 200 and threshes the cuttings to form threshings, the threshings move along thresher 200 in the direction of arrowed line B from cuttings intake end 62 of thresher 200 to a downstream location or end of thresher 200, the grains formed by the threshing action of thresher 200 fall through sieves into a collection tank inside the combine harvester, which is periodically emptied, and the chaff is ejected onto the field from the combine harvester.

With threshing drum 60 of thresher 200 mounted for rotation in the conventional manner in threshing direction of rotation A about axis X of rotation of threshing drum 60 of thresher 200, threshing drum 60 rotates about axis X of rotation and axis X of rotation is not only the axis of rotation of thresher 200 but also the axis of rotation of threshing drum 60. Axis X of rotation is referred to interchangeably as being the axis of rotation of thresher 200 and also threshing drum 60 of thresher 200. Axis X of rotation X is perpendicular relative to the threshing direction of rotation A of threshing drum 60 as described in connection with thresher 55. A population of conventional threshing drum threshing rasps or bars 210 is affixed to cylindrical exterior 61 of threshing drum 60. Cylindrical exterior 61 has frusto-conical segment or cone 61A extending outwardly to cuttings intake end 62, which is the narrowed end of cone 61A. In the present embodiment, there are two helical auger flight assemblies 201A and 201B, which are affixed to cone 61A of cylindrical exterior 61 of threshing drum 60 near cuttings intake end 62 of threshing drum 60 so as to be diametrically opposed in relation to one another. Arrowed line A indicates the direction of rotation of threshing drum 60 about axis X of rotation of threshing drum 60, which is the direction of rotation/travel of threshing rasps or bars 210 and also helical auger flight assemblies 201A and 201B affixed to threshing drum 60.

In response to rotation of threshing drum 60 of thresher 200 in the threshing direction of rotation A about axis X of rotation, threshing rasps or bars 210 and helical auger flights 80 are driven so as to rotate in the threshing direction of rotation A about axis X of rotation of thresher 200. Threshing rasps or bars 210 are operable for threshing a crop applied between cylindrical exterior 61 of threshing drum 60 and the thresher concave (not shown) in response to rotation of threshing drum 60 in the threshing direction of rotation A. And so in response to rotation of threshing drum 60 in the threshing direction rotation A about axis X of threshing drum 60, threshing bars 210 thresh the crop cuttings between cylindrical exterior 61 and the concave separating the grains from the chaff to form threshings, namely, the chaff and the separated grains. The threshings are moved along the rotating thresher 200 in a direction indicated generally by arrowed line B from cuttings intake end 62 of threshing drum 60 of thresher 200 to the downstream location or end of thresher drum 60 of thresher 200, and the threshings are applied to the sieves and to the collection tank of the combine, whereby the grains fall through the sieves into the collection tank inside the combine harvester, which is periodically emptied, such as into tractors that drive alongside, while a conveyor takes up and conveys the chaff to an ejection spout for ejection onto the field from the combine harvester. As threshing drum 60 rotates in the threshing direction of rotation A about axis X of threshing drum 60, the cuttings are applied to cuttings intake end 62 of thresher drum 60 of thresher 200 and helical auger flight assemblies 201A and 201B forcibly rotate through the cuttings applied to cuttings intake end 62 of thresher drum 60 of thresher 200 and interact with and drive the cuttings to thresher drum 60 for threshing in the direction indicated by arrowed line B. Helical auger flight assemblies 201A and 201B cooperate together as a cuttings intake or driving auger system or assembly that receives and applies cuttings to thresher drum 60 for threshing from cuttings intake end 62.

Helical auger flight assemblies 201A and 201B are identical to one another in every respect, and thresher 200 is configured with two opposed helical auger flight assemblies 201A and 201B in the present embodiment that together cooperate as a cuttings intake or driving auger system or assembly operable for picking up and driving cuttings in the direction of arrowed line B to thresher drum 60 of thresher 200 for threshing. Because helical auger flight assemblies 201A and 201B are identical to one another, the details of helical auger flight assembly 201A will be discussed in detail, with the understanding that the ensuing discussion of helical auger flight assembly 201A applies equally to helical auger flight assembly 201B. Also, because helical auger flight assemblies 201A and 201B are identical, they are referenced with common reference characters as is appropriate in conjunction with this specification.

Referencing FIGS. 11-17 in relevant part, helical auger flight assembly 201A consists of wear plate 202 and helical auger flight 204. Helical auger flight 204 is a vane 220. Like vane 90, vane 220 identically consists of a single, unitary body fashioned of steel or other strong, rugged metal, and which is a thin, curved body that is made or otherwise caused to rotate about axis X in the threshing direction of rotation A in response to rotation of threshing drum 60 in the threshing direction of rotation A about axis X being the axis of rotation of threshing drum 60. Like vane 90, vane 220 is thin in that it is approximately ½-¾ of an inch thick. Like vane 90, vane 220 has arcuate or curvilinear inner or lower edge 221 and an opposed arcuate or curvilinear outer or upper edge 222, a forward or leading extremity or end 223 an opposed rearward or trailing extremity or end 224, an outer face 225 and an opposed inner face 226, which is a cuttings driving face of vane 220 of flight 204. Vane 220 is elongate in that it has a length extending from leading extremity 223 to trailing extremity 224, and vane 220 has a width extending from lower edge 221 to upper edge 222. The width of vane 90 extending between inner edge 221 and outer edge 222 is not constant and has its greatest dimension at leading extremity 223 of vane 220 and its least dimension at trailing extremity 224 of vane 220. Furthermore, the width of vane 220 between inner edge 221 of vane 220 and outer edge 222 of vane 220 gradually tapers, i.e. becomes gradually smaller, from leading extremity 223 of vane 220 to trailing extremity 224 of vane 220. These features of vane 220 are identical to that of vane 90.

Like vane 90, vane 220 is affixed to cone 61A of cylindrical exterior 61 near inner edge 221. Vane 220 is preferably releasably connected/affixed to cone 61A of cylindrical exterior 61 near lower edge 91 with releasable fasteners 97, which are preferably conventional nut-and-bolt fasteners that bolt vane 220 to cone 61A. The nut-and-bolt fasteners 97 are applied at spaced intervals along the length of vane 220 from leading extremity 223 to trailing extremity 224, and are exemplary of releasable fasteners that releasably connect/affix vane 220 to cylindrical exterior 61 of threshing drum 60 via bolting. Fasteners 97 are releasably secured between vane 220 near inner edge 221 of vane 220 and one or more flanges formed on, and which form a part of, cone 61A of cylindrical exterior 61, and again this is a common and well-known arrangement for securing helical auger flights to threshing drums, the details of which are well-known to those having ordinary skill and are not discussed. The releasable attachment of vane 220 to cone 61A of cylindrical exterior 61 of threshing drum 60 with releasable fasteners 97 releasably connects vane 220 to cone 61A of cylindrical exterior of threshing drum 60 so as to allow vane 220 to be readily and non-destructively removed for repair, maintenance, or replacement, and this is well-known in the art as discussed above in connection with vane 90.

Figure 12:
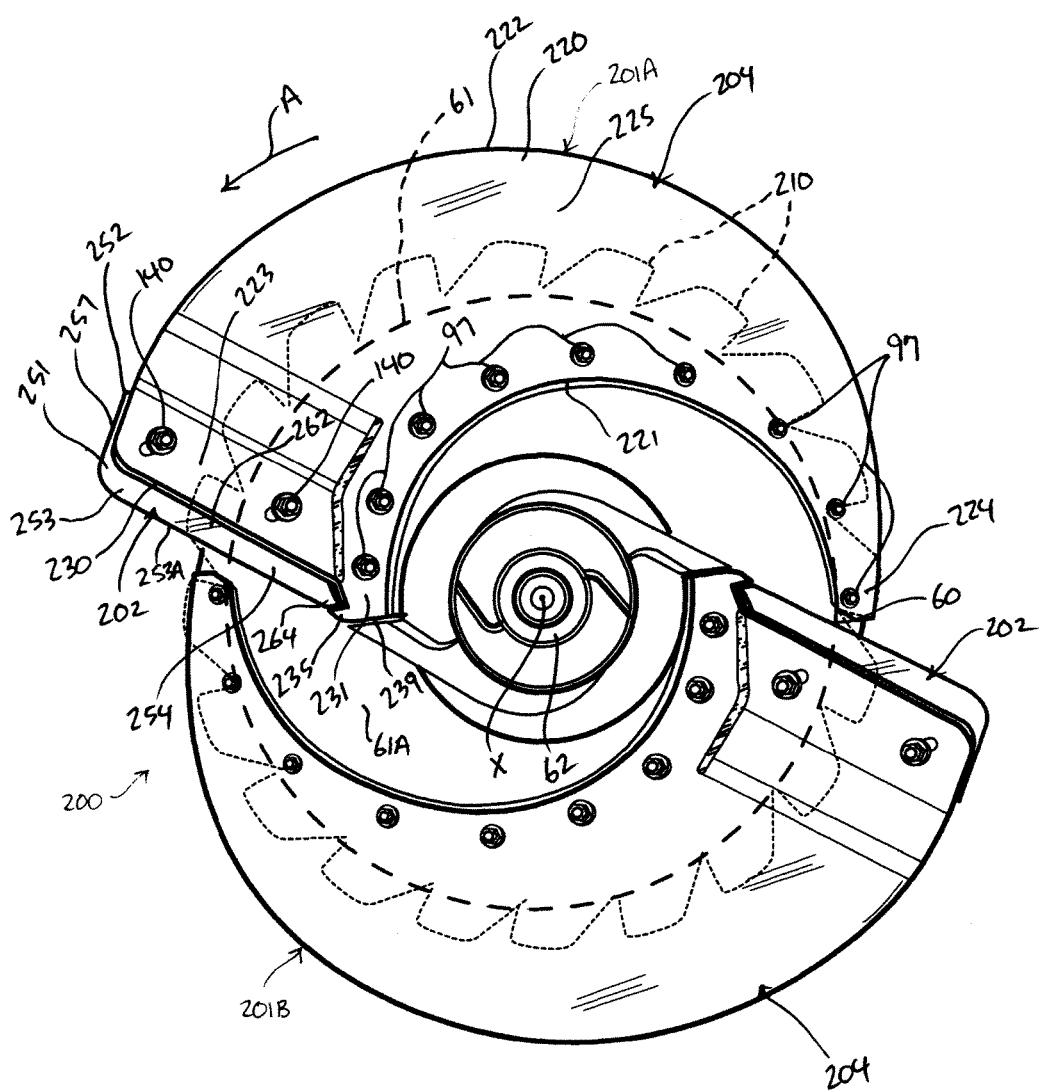
FIG. 12 is a front elevation view of the embodiment of FIG. 11.

The orientation of vane 220 releasably connected to cone 61A is identical to that of the orientation of vane 90 releasably connected to cone 61A as discussed in detail above and will now be summarized. Vane 220 extends outwardly from cone 61A from inner edge 221 at cone 61A of cylindrical exterior 61 of threshing drum 60 to outer edge 222, leading extremity 223 is directed forwardly into the threshing direction of rotation A, and opposed trailing extremity 224 is directed rearwardly away from the threshing direction of rotation A, and this is best illustrated in FIGS. 11 and 12. Outer and inner faces 225 and 226 of vane 220 are parallel relative to each other. The described angles shown in FIG. 8 in connection with the descriptions of vane 90 apply identically to vane 220. Referencing the angles shown in FIG. 8, outer face 225 of vane 220 faces outwardly toward cuttings intake end 62 of threshing drum 60 and away from the threshing direction of rotation A that is set at constant oblique angle Ø1 relative to axis X of rotation of threshing drum 60. Inner face 226 of vane 220 faces away from cuttings intake end 62 of threshing drum 60 and into or otherwise toward the threshing direction of rotation A and is set at constant oblique angle Ø2 relative to axis X of rotation of threshing drum 60 and that is also set at constant oblique angle Ø3 relative to and facing the threshing direction of rotation A of threshing drum 60, which allows inner face 226 to encounter and drive cuttings to thresher drum 60 in the direction indicated by arrowed line B in FIG. 11 from cuttings intake end 62 of thresher drum 60 of thresher 200 in response to rotation of threshing drum 60 in the threshing direction of rotation A about axis X of rotation of threshing drum 60. Like vane 90, vane 220 is thus arranged in the helix relative to threshing drum 60, which means that it extends along a curve traced on cone 61A by the rotation of threshing drum 60 in the threshing direction of rotation A about axis X of rotation of threshing drum 60 crossing its right sections, i.e., its outer and inner faces 225 and 226, at constant oblique angles, namely, angles Ø1 and Ø2, relative to axis X of rotation of threshing drum 60. Angles Ø1 and Ø2 in relation to vane 90 in FIG. 8 are equal to each other and are each greater than the constant oblique angle Ø3, and this also applies to vane 220. Furthermore, the dimension of angles Ø1 and Ø2 in connection with vane 90 also apply to vane 220. As vane 220 is arranged in a helix, in response to rotation of threshing drum 60 in the threshing direction of rotation A about axis X of threshing drum, vane 220 rotates in the threshing direction of rotation A about axis X of rotation of threshing drum 60 leading with leading extremity 223 and is driven leading extremity 223 first, and because inner face 226 is directed into the threshing direction of rotation A and faces the threshing direction of rotation A at angle Ø3 relative to threshing direction of rotation A and because angle Ø3 is less than angle Ø2 between inner face 226 and axis X of rotation of threshing drum 60, inner face 226 angularly helically encounters the cuttings so as to take up and drive the cuttings to thresher drum 60 for threshing in the direction indicated by arrowed line B in FIG. 11 away from cuttings intake end 62 of thresher drum 60 of thresher 200.

As best seen in FIG. 15, leading extremity 223 of vane 220 is characterized in that it has a leading edge 230 and a prominence 231 each directed into the threshing direction of rotation A. Leading edge 230 and prominence 231 are parts of leading extremity 223. According to the principle of the invention, prominence 231 has an inner end 232 and an opposed outer end 233 and is located near cone 61A of cylindrical exterior 61 of threshing drum 60. Leading edge 230 is elongate and straight and extends from outer edge 222 of vane 220 in the direction of prominence 231 and inner edge 221 to inner end 232 of prominence 231 and it is at this location where leading edge 230 and prominence 231 intersect. Prominence 231 is integral with leading edge 230 and extends outward from leading edge 230 of leading extremity 223 into the threshing direction of rotation A from inner end 232 of prominence 231 to outer end 233 of prominence 231. Outer end 233 has an upturned jut 235 that terminates distally at a tip 236. Jut 235 is upturned away from inner edge 221 of vane 220 in the direction of outer edge 222 of vane 220 and has a contact surface 237 that extends between outer end 233 of prominence 231 and tip 236 from outer end 233 to tip 236. Contact surface 237 faces upwardly in the direction of outer edge 222 of vane 220 and is angled inwardly toward leading edge 230. Outer end 233 of prominence 231 terminates distally with a forward edge 239 that extends between inner edge 221 of vane 220 and tip 236. Leading edge 230 of vane 220 extends outwardly from inner end 232 of prominence 231 near cone 61A of cylindrical exterior 61 of threshing drum 60 to outer edge 222 of vane 220. Leading edge 230 has a length that extends from inner end 232 of prominence 231 to outer edge 222 of vane 220.

Leading edge 230 and prominence 231 of leading extremity 223 end 93 of vane 220 are directed into the threshing direction of rotation A of threshing drum 60. Because vane 220 of flight 80 leads with leading extremity 223, leading extremity 223, including leading edge 230 of leading extremity 223, is susceptible to damage and wear in response to impacting cuttings in response to rotation of threshing drum 60 about axis X in the threshing direction of rotation A, which requires vane 220 to be repeatedly repaired or replaced to ensure proper or desired operation as leading extremity 223, including leading edge 230, becomes worn and damaged. To solve these problems and to prevent premature wear and damage to leading extremity 223 of vane 220 of flight 204 according to this embodiment, including leading edge 230 of vane 220 of flight 204, a sacrificial shield and wear plate 202 is releasably attached/connected to leading extremity 223 of vane 220 of flight 80 so as to form helical flight assembly 201A consisting of wear plate 202 releasably or otherwise removably attached/connected to vane 220. In common with wear plate 120 discussed in detail above, wear plate 202 is applied between leading extremity 223 of vane 220 and threshing direction of rotation A of threshing drum 60 so as to be in a shielding relationship relative to leading edge 230 of leading extremity 223 to shield leading extremity 223, including leading edge 230, of vane 220 of flight 204 from impacting cuttings and to also deflect cuttings away from cuttings intake end 62 of threshing drum 60 and to inner face 226 of vane 220 of flight 204 in response to rotation of threshing drum 60 in the threshing direction of rotation A about axis X of rotation of threshing drum 60.

Referencing FIGS. 11-18 in relevant part, like wear plate 120, wear plate 202 consists of body 251 that is a single, one-piece unitary body formed by machining or forging or molding, and which is preferably formed of hardened metal, such as preferably conventional hardened steel or cast iron. Body 251 has an inner or rear end 252 and an opposed outer or front end 253 formed with front edge 253A and a nose 264 having contact surface 264A, an outer surface 254 and an opposed inner surface 255, an inner or lower edge 256 and an opposed outer or upper edge 257 that each extend between inner and outer ends 252 and 253, and, more specifically, between inner end 252 and front edge 253A. Inner or lower edge 256 is at the inner or lower extremity of body 251, and outer or upper edge 257 is at the outer or upper extremity of body 251. Body 251 has a width that extends from inner end 252 to outer end 253, and body 251 has a length that extends from inner edge 256 to outer edge 257. Inner end 252 is parallel with respect to outer end 253, and outer end 253 is characterized in that it includes front edge 253A. Front edge 253A is narrowed and sharpened so as to be a cutting edge that extends along the entire length of body 251 from inner edge 256 and along nose 264 to outer edge 257. Body 251 of wear plate 202 is approximately ½-¾ of an inch thick.

Figure 14:
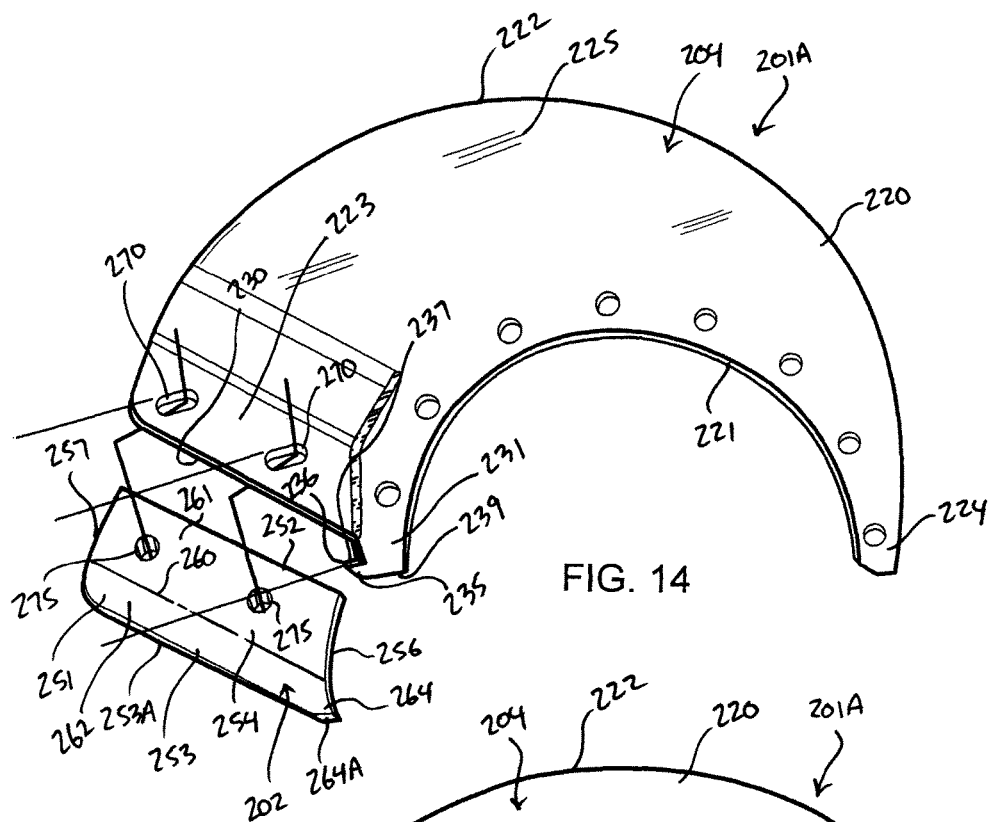
FIG. 14 is a front elevation view similar to that of FIG. 12 illustrating one of the helical auger flight assemblies as it would appear disassembled and detached from the thresher.
Figure 14A:
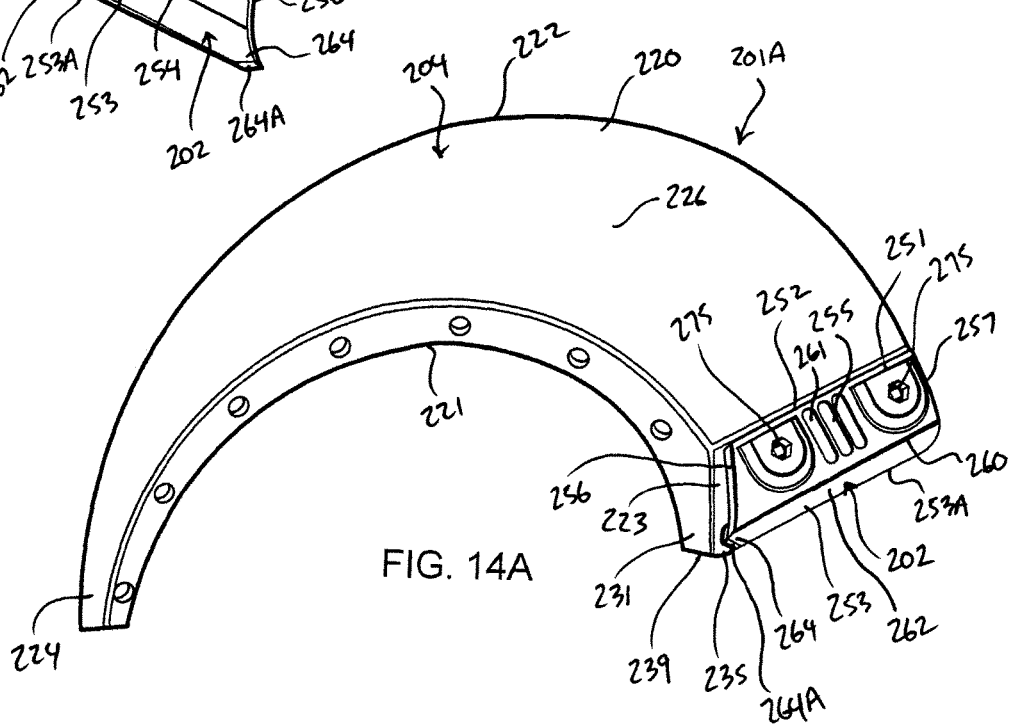
FIG. 14A is a rear elevation of the embodiment of FIG. 14 illustrating a wear plate as it would appear applied to a helical auger flight.

Body 251 is formed with a transverse bend denoted at 260 in FIGS. 14, 14A, and 14B. Like bend 130 of wear plate 12, bend 260 is located between inner end 252 and outer end 253, and extends along the entire length of body 251 from inner edge 256 at the outer extremity of body 251 of wear plate 202 to outer edge 257 at the inner extremity of body 251 of wear plate 202. Bend 260 is parallel with respect to inner and outer ends 252 and 253 of body 251 and divides body 251 into two angularly offset sections or extremities like that of wear plate 120, including an inner or rear section or extremity of body 251 that extends from inner end 252 to bend 260 and which is denoted generally at 261, and an outer or front section or extremity of body 251 that extends from bend 260 to outer end 253 and which is denoted generally at 262. Front extremity 262 includes front edge 253A and additionally nose 264, and front extremity 262 extends from the outer extremity at outer edge 257 and along nose 264 to the inner extremity at inner edge 256 of wear plate 202. Nose 264 is a downturned extension in the nature of a stub or nubbin in the lower extremity of wear plate 202 at the front extremity 261 of wear plate 202. Nose 264 terminates distally at contact surface 264A.

At bend 260 body 251 is bent outwardly, namely, toward outer surface 254 and away from inner surface 255 such that body 251 is outwardly bent toward outer surface 254 and away from inner surface 255. Front extremity 262 is, thus, bent outwardly relative to rear extremity 261 such that front extremity 262 is outwardly, angularly disposed relative to rear extremity 261. Like wear plate 120, outer and inner surfaces 254 and 255 extending along rear extremity 261 of wear plate 202 are parallel relative to each other, and outer and inner surfaces 254 and 255 extending along front extremity 262 of wear plate 202 are parallel relative to each other. Outer and inner surfaces 254 and 255 are each contiguous, which means that outer surface 254 of rear extremity 261 of wear plate 202 meets and is in contact with outer surface 254 of front extremity 262 of wear plate 202, and inner surface 255 of rear extremity 261 of wear plate 202 meets and is in contact with inner surface 255 of front extremity 262 of wear plate 202.

Figure 13:
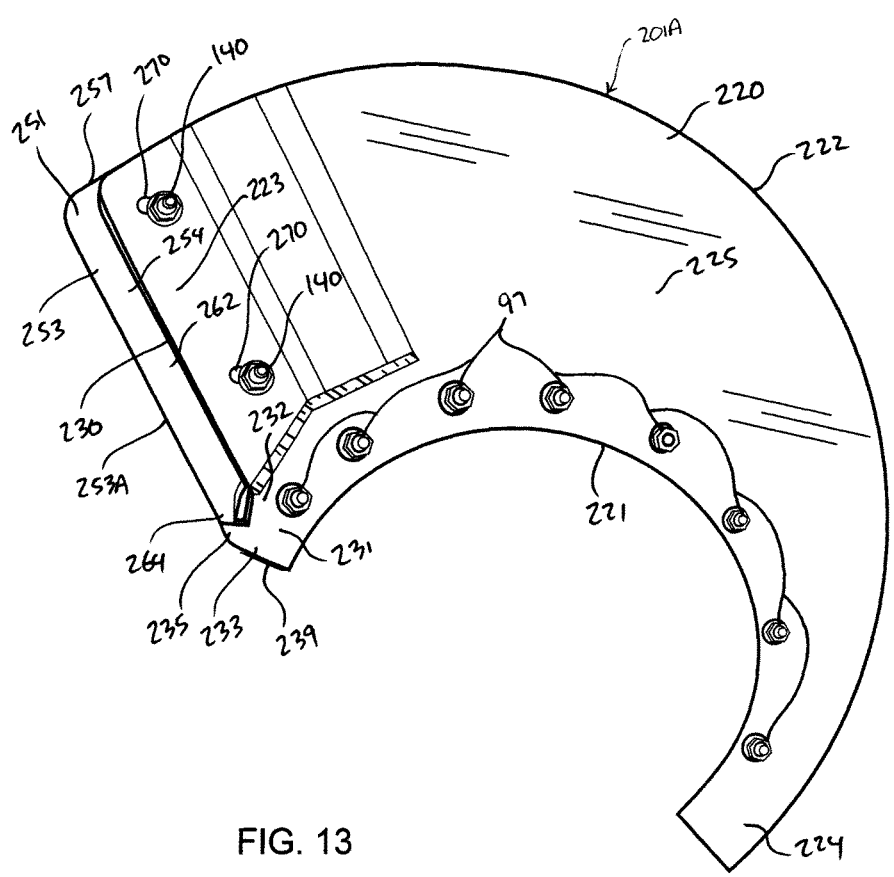
FIG. 13 is a front elevation view a one of the helical auger flight assemblies of FIG. 11 shown as it would appear assembled and detached from the thresher.

FIGS. 11, 12, 13, 16 and 18 illustrate wear plate 202 as it would appear installed with or otherwise affixed to leading extremity 223 of vane 220 so as to form helical auger flight assembly 201A according to the principle of the invention. FIG. 13 shows helical auger flight assembly 201A as it would appear assembled in preparation for installation onto thresher drum 60. Referencing FIGS. 11, 12, 13, 16 and 18 in relevant part, wear plate 202 is preferably affixed to vane 220 with releasable fasteners 140, which are preferably conventional nut-and-bolt fasteners. The nut-and-bolt fasteners 140 that bolt wear plate 202 to leading extremity 223 are spaced apart from one another, are applied and secured between wear plate 202 and vane 220 near leading edge 230 of leading extremity 223 of vane 220 so as to bolt wear plate 202 to vane 220. Fasteners 140 are exemplary of releasable fasteners that releasably affix/connect wear plate 202 to vane 220. The releasably attachment of wear plate 202 to vane 220 with nut-and-bolt fasteners 140 allows wear plate 202 to be easily attached and readily removed non-destructively for repair, maintenance, or replacement. According to the principle of the invention, wear plate 202 shields leading extremity 223 and leading edge 230 of vane 220 of flight 80 from impacting cuttings like just that of wear plate 120 so as to take the brunt of cuttings impact, and is structured just like that of wear plate 120 to deflect cuttings away from the cuttings intake end 62 of the threshing drum and to inner face 96 of vane 220 of flight 80 in response to rotation of threshing drum 60 in threshing direction of rotation A about axis X of rotation of threshing drum 60.

In the installation of wear plate 202 onto vane 220 of flight 204, outer surface 254 of rear extremity 261 of body 251 of wear plate 202 near inner end 252 of wear plate 202 extending between bend 260 and inner end 252 of body 251 of wear plate 202 is positioned alongside of and against so as to be in contact with inner face 226 of vane 220 of flight 204 near leading extremity 223 and leading edge 230 of vane 220 of flight 204. FIG. 14A is a rear elevation view illustrating wear plate 202 as it would appear applied to and against inner face 226 of vane 220 of flight 204 near leading extremity 223 in preparation for being releasably connected to vane 220 via bolting. Wear plate 202 body 251 is positioned such that inner and outer ends 252 and 253 and bend 260 are parallel with respect to leading edge 230 of leading extremity 223 of vane 220, and outer surface 254 of rear extremity 261 of wear plate 202 extends downwardly along inner face 226 of vane 220 from inner end 252 of wear plate 202 to bend 260 at leading edge 230 of leading extremity 224 of vane 220. Bend 260 is located under leading extremity 223 edge 230 of leading extremity 223 of vane 220.

And so with wear plate 202 positioned or otherwise oriented such that inner and outer ends 252 and 253 and bend 260 of wear plate 202 are parallel with respect to leading edge 230 of leading extremity 223 of vane 220, body 251 of wear plate 202 thus extends along the length of leading edge 230 of leading extremity 223 of vane 220 from outer edge 257 of wear plate 202 at outer edge 221 of flight 204 to inner edge 256 of wear plate 202 at inner end 232 of prominence 231. Front extremity 262 extends forwardly of leading edge 230 of flight 204 to front edge 253A so as to shield leading edge 230 of flight 204 from impacting cuttings and for deflecting cuttings rearwardly away from cuttings intake end 62 of threshing drum 60 in response to rotation of threshing drum 60 in the threshing direction of rotation A. Contact surface 64A of nose 64 is, in turn, in direct contact against contact surface 237 of jut 235, and forward edge 239 of prominence 231 and front edge 253A of wear plate 202 converge at tip 236 of jut 235 and nose 264 of wear plate 202, respectively, where the nose 264 and the jut 235 intersect.

According to the described positioning of wear plate 202 relative to and along leading extremity 223 of vane 220 of flight 204, wear plate 202 extends across leading extremity 223 of vane 220 across the length of leading edge 230 and leading extremity 223 of vane 220 of flight 204 from outer edge 222 of flight 204 to inner end 232 of prominence 231, and front extremity 262 of body 251 of wear plate 202 extends forward away from bend 260 of body 251 of wear plate 202 and leading edge 230 of leading extremity 223 of vane 220 of flight 220 to outer end 253 of body 251 of wear plate 202 terminating distally with front edge 253A, and contact surface 64A of nose 264 is in direct contact against contact surface 237 of jut 235, whereby forward edge 239 of prominence 231 and front edge 253A of wear plate 202 converge at tip 236 of jut 235 and nose 264 of wear plate 202, respectively, where the nose 264 and the jut 235 intersect. This installation of wear plate 202 locates wear plate 202 in a shielding relationship, which is between leading extremity 223 and leading edge 230 of vane 220 and threshing direction of rotation A causing inner surface 255 of wear plate 202 extending along trailing and leading extremities 261 and 262 and facing into threshing direction of rotation A to take the brunt of cuttings impact in response to rotation of threshing drum 60 in the threshing direction of rotation A about axis X of threshing drum 60 and thereby protect and shield leading extremity 223 and leading edge 230 of vane 220 from impacting cuttings in response to rotation of threshing drum 60 in the threshing direction of rotation A about axis X of threshing drum 60. Because body 251 is bent outwardly at bend 260 toward outer surface 254 of wear plate 202 and away from inner surface 255 of wear plate 202 such that front extremity 262 of wear plate 202 is bent outward relative to rear extremity 261 of wear plate 202 as described above, because outer surface 254 of rear extremity 261 of body 251 of wear plate 202 near inner end 252 of wear plate 202 extending between bend 260 and inner end 252 of body 251 of wear plate 202 is positioned alongside of and against so as to be in contact with inner face 96 of vane 220 of flight 204 near leading extremity 223 and leading edge 230 of vane 220 of flight 204, because body 251 of wear plate 202 is positioned such that inner and outer ends 252 and 253 and bend 260 are parallel with respect to leading edge 230 of leading extremity 223 of vane 220 and because outer surface 254 of rear extremity 261 of wear plate 202 extends downwardly along inner face 96 of vane 220 from inner end 252 of wear plate 202 to bend 260, which is located under and outboard of leading edge 230 of leading extremity 223 of vane 220, front extremity 262 of wear plate 202 extends outwardly from leading edge 230 of leading end 92 of vane 220 from outer edge 222 of vane 220 to inner end 232 of prominence 231, is located ahead of or otherwise outboard of leading edge 230 of leading extremity 223 of vane 220, and is angled away from leading extremity 223 and from leading edge 230 of vane 220 and also from outer and inner faces 225 and 226 of vane 220 toward cuttings intake end 62 of threshing drum 60. The contact between nose 264 and jut 235 and the positioning of wear plate 202 relative to prominence 231 relates the forward edge 239 of prominence 231 to the front edge 253A so as to align forward edge 239 of prominence 231 with front edge 253A of wear plate 202, which makes forward edge 239 an extension of front edge 253A and, in turn, which makes front edge 253A an extension of forward edge 239. This cooperation between forward edge 239 of prominence 231 of vane 220 and front edge 253A of wear plate 202 produces continuity between front edge 253A and forward edge 239, which promotes shielding of leading edge 223A of leading extremity 223, promotes deflection of crop material in the direction of arrowed line B as explained above, and prevent crop material from wrapping and clogging at the intersection of nose 264 and prominence 235.

With this shielding positioning of wear plate 202 relative to leading extremity 223 of vane 220, wear plate 202 is then releasably affixed to vane 220 via bolting with releasable fasteners 140, which are preferably conventional nut-and-bolt fasteners as previously described. The nut-and-bolt fasteners 140 used to bolt wear plate 202 to vane 220 are spaced apart from one another, are secured between rear extremity 261 of wear plate 202 and vane 220 near leading edge 230 of leading extremity 223 of vane 220, and are exemplary of releasable fasteners that releasably connect/affix wear plate 202 to vane 220. Again, the releasably attachment of wear plate 202 to vane 220 with fasteners 140 allows wear plate 202 to be removed for repair, maintenance, or replacement.

Referencing FIG. 14, leading extremity 223 of vane 220 is formed with a set fastener openings 270 near leading edge 230, and rear extremity 261 of wear plate 202 is formed with corresponding set fastener openings 275 between bend 260 and inner end 252. Fastener openings 275 of wear plate 202 correspond to and align with fastener openings 270 of vane 220, which concurrently receive fasteners 140 to releasably secure wear plate 202 to vane 220. Fastener openings 275 formed in wear plate 202 correspond to fastener openings 270 formed in vane 220 such that when aligned and fitted with fasteners 140 releasably affixing wear plate 202 to vane 220 produce the specific positioning of wear plate 202 relative to vane 220 as discussed in detail above.

Figure 16:
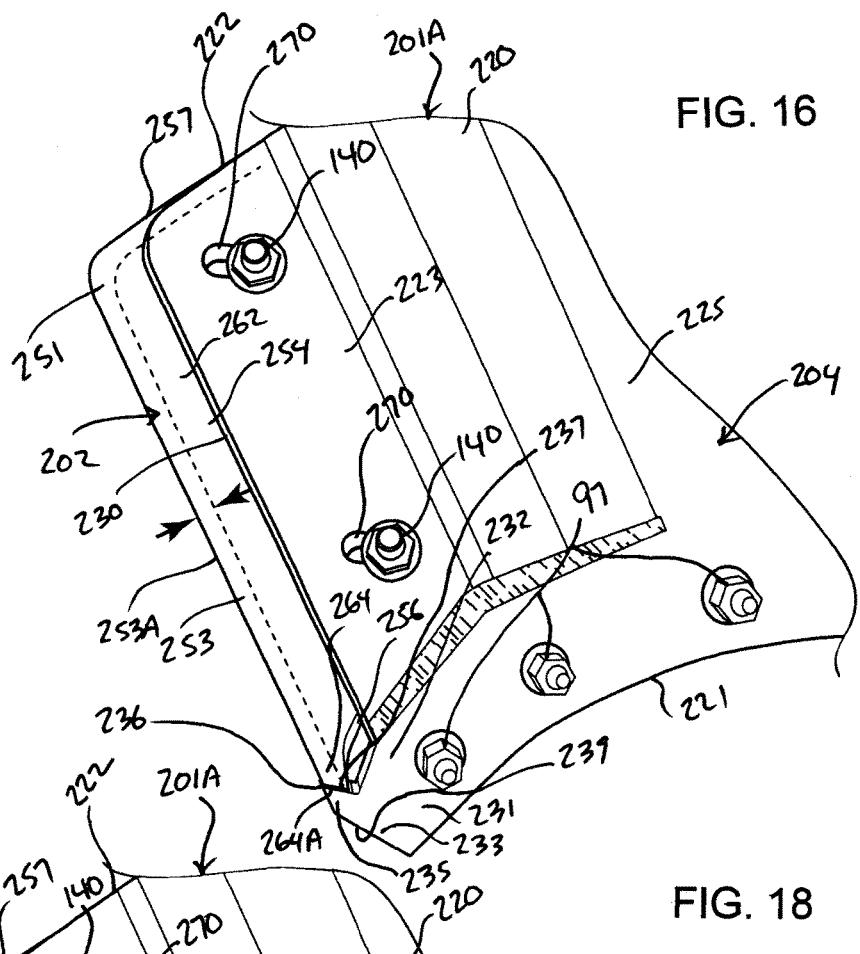
FIG. 16 is an enlarged, fragmented view of the embodiment of FIG. 13 illustrating the sacrificial shield and wear plate as it would appear releasably connected to the helical auger flight.
Figure 18:
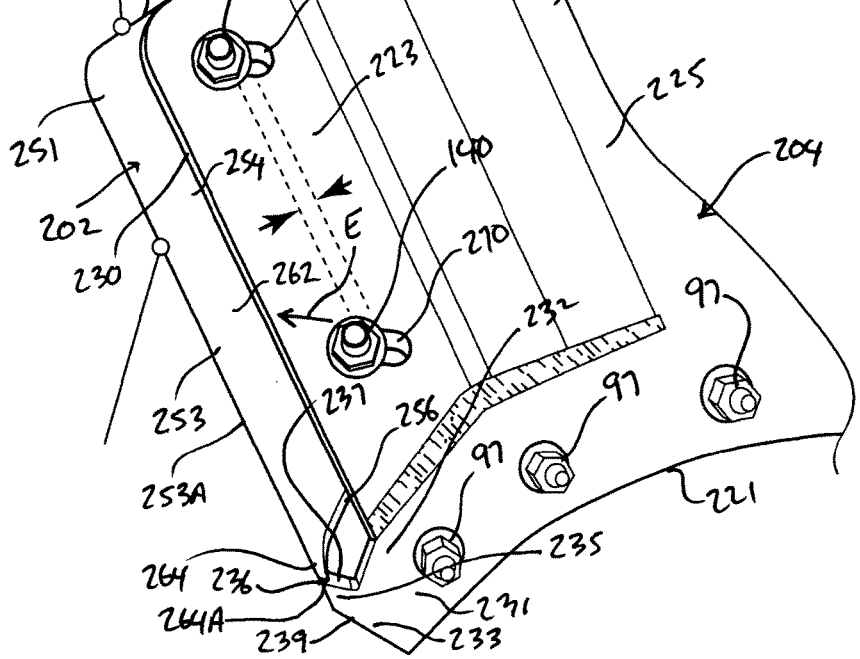
FIG. 18 is a view similar to that of FIG. 16 illustrating the sacrificial shield and wear plate as it would appear worn down as a result of prolonged use and affixed to the helical auger flight in an adjusted position to compensate for the illustrated wear.
Figure 17:
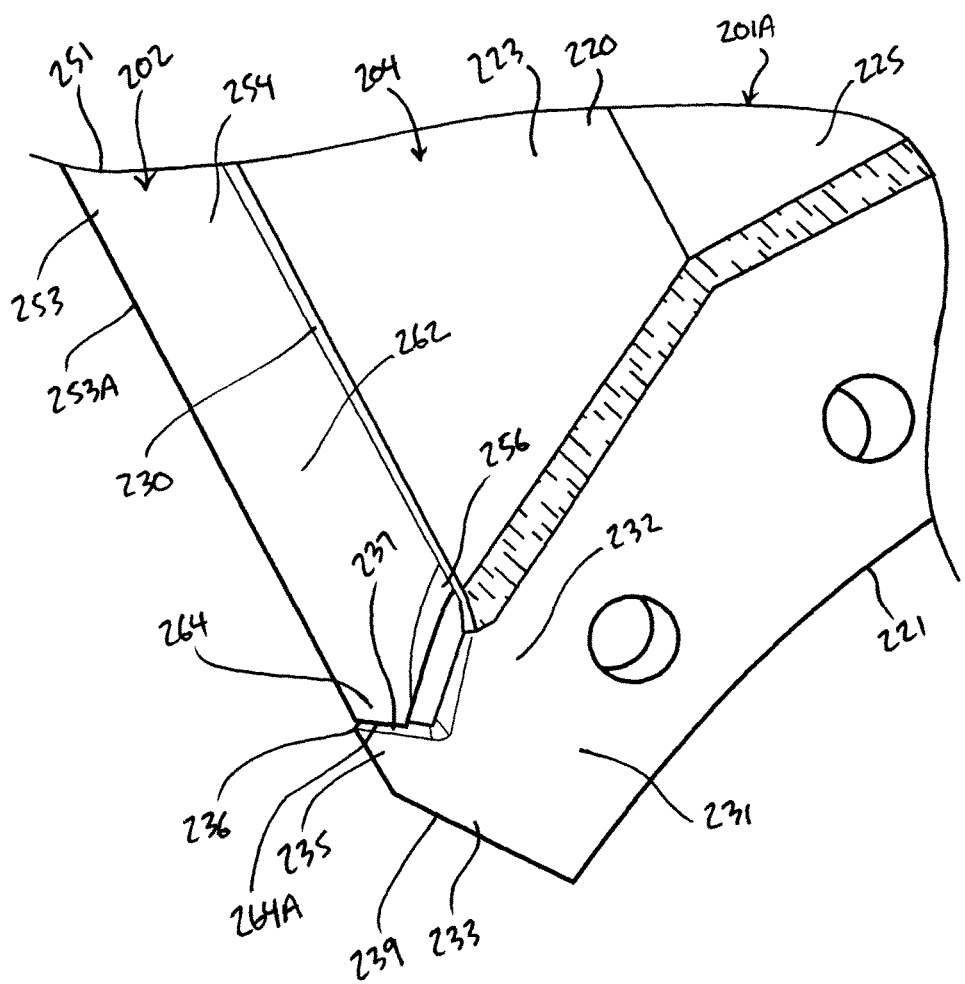
FIG. 17 is an enlarged, fragmented view of the embodiment of FIG. 16 illustrating a nose of the sacrificial shield and wear plate as it would appear in direct contact against a contact surface of a jut of a prominence of the helical auger flight.

As seen in FIG. 15, fastener openings 270 through vane 220 are each elongate in a direction that is parallel with respect to contact surface of jut 25. In other words, fastener openings 270 are elongate and parallel relative to each other and to contact surface 237 of jut 25. This allows wear plate 202 to be adjusted in reciprocal directions in the directions of double arrowed line D, which is the direction fastener openings 270 are each elongate in, so as to bring front edge 253A front edge 253A of wear plate 202 into alignment with forward edge 239 of prominence 251. Should front edge 253A of wear plate 202 be worn down after prolonged use, such as to dotted wear line 280 denoted in FIG. 16, bringing front edge 253A of wear plate 202 out of alignment with respect to forward edge 239 of prominence 231, fasteners 140 may be loosened to permit wear plate 202 to be adjusted/moved outwardly in the direction of arrowed line E in FIG. 18 along the lengths of fastener openings 270 so as to bring the worn front edge 253A of wear plate 202 back into alignment with forward edge 239 of prominence 231 as is illustrated in FIG. 18. The parallel relationship between contact surface 237 of jut 235 of fastener openings 270 ensures that contact surface 264A of nose 264 remains in contact against contact surface 237 of jut 235 during the described adjustment of wear plate 202. And so FIG. 18 is a view similar to that of FIG. 16 illustrating wear plate 202 as it would appear with front edge 253A worn down as a result of prolonged use and affixed to flight 204 in an adjusted position via fastener openings 270 to compensate for the illustrated wear so as to bring front edge 253A of wear plate 202 back into alignment with forward edge 239 of prominence 231.

The described angles shown in FIG. 8 in connection with the descriptions of wear plate 120 apply identically to wear plate 202. Referencing FIG. 11, and also the angles shown in FIG. 8 in connection with wear plate 120, with wear plate 202 installed and affixed in place with vane 220 as discussed in detail above, front extremity 262 and outer and inner surfaces 254 and 255 thereof extend angularly outwardly from leading edge 230 of leading extremity 223 of vane 220 to outer end 253 of wear plate 202 toward cuttings intake end 62 of threshing drum 60. Outer surface 254 of front extremity 262 faces outwardly toward cuttings intake end 62 of threshing drum 60 and away from the threshing direction of rotation A and is set at constant oblique angle Ø4 relative to axis X of rotation of threshing drum 60 like that of wear plate 120. Inner surface 255 of front extremity 262 faces away from cuttings intake end 62 of threshing drum 60 and faces into the threshing direction of rotation A and is set at constant oblique angle Ø5 relative to axis X of rotation of threshing drum 60 and is also set at a constant oblique angle Ø6 relative to threshing direction of rotation A. Angles Ø4 and Ø5 are equal to one another in this example, are each less than each of angles Ø1 and Ø2 in this example, and are each greater than angle Ø3 and also angle Ø6 in this example. Angle Ø6 between inner surface 255 of front extremity 262 and threshing direction of rotation A is greater than angle Ø3 between inner face 96 of vane 220 and threshing direction of rotation A and is less than angles Ø1 and Ø2, and inner surface 255 of front extremity 262 of wear plate 202 is, and functions, as a cuttings deflecting inner surface of wear plate 202 for not only shielding leading edge 230 and leading extremity 223 of vane 220 from impacting cuttings in response to rotation of threshing drum about axis X in the threshing direction of rotation A, but also deflecting cuttings along inner surface 255 of lower section 262 of wear plate 202 from threshing drum 60 in the direction indicated by arrowed line B in FIG. 11 toward inner face 96 of vane 220 in response to rotation of threshing drum 60 in the threshing direction of rotation A placing the cuttings in the path of the oncoming inner face 96 of vane 220 for allowing the cuttings to be driven by and along inner face 96 of vane 220 to threshing drum 60 of thresher 55 for threshing in the direction of arrowed line B in FIG. 11. As explained above, in a particular embodiment of flight assembly 201A angles Ø1 and Ø2 are each 65 degrees, angle Ø3 is 25 degrees, angles Ø4 and Ø5 are each 55 degrees, and angle Ø6 is 35 degrees.

It is to be emphasized that in response to rotation of threshing drum 60 in the threshing direction of rotation A about axis X of threshing drum 60, flight 220 leads with wear plate 202 releasably affixed to leading extremity 223 shielding and protecting leading extremity 223 and leading edge 230 of vane 220 from impacting cuttings, in which front edge 253A of outer end 253 of wear plate 202 cuts into the cuttings so as to cut them further, inner surface 255 of front extremity 262 of wear plate 202 deflects cuttings to inner face 96 of flight 220 for driving the cuttings to thresher drum 60 for threshing in the direction of arrowed line B in FIG. 11. Furthermore, because inner surface 255 of wear plate 202 is directed into the threshing direction of rotation A of threshing drum 60, the entirety of inner surface 255 of wear plate 202 extending from inner end 252 of wear plate 202 to outer end 253 of wear plate takes the brunt of cuttings impact protecting leading extremity 223 and leading edge 230 of vane 220 from wear and damage. Should wear plate 202 become damaged or worn, it may be easily removed for repair or replacement without having to replace vane 220 of flight 80.

As seen in FIGS. 11 and 12, flights 201 are arranged leading extremity 223 with attached wear plate 202 to trailing extremity 224, and are offset relative to each other and diametrically oppose one another. Flights 201 operate identically to one another as fully described in connection with flight 201A, and flights 201 are sized to fully encircle cone 61A of cylindrical exterior 61 of threshing drum causing them to cooperate to form a cuttings intake or driving auger system or assembly that forcibly rotates through the cuttings applied to cuttings intake end 62 of thresher drum 60 of thresher 200 and forcibly takes up and drives the cuttings to thresher drum 60 of thresher 55 in the direction of arrowed line B in FIG. 11 for threshing in response to rotation of threshing drum 60 in the threshing direction of rotation A about axis X of threshing drum 60. Although threshing drum 60 incorporates two flights 201, more can be used if so desired without departing from the invention.

Attention is now directed to FIGS. 19-22 illustrating an alternate embodiment of the invention, namely, an alternate embodiment of a wear plate 202' that may be assembled with flight 204, illustrated in FIGS. 21 and 22, so as to produce a helical auger flight assembly. In common with wear plate 202, wear plate 202' shares body 251, inner or rear end 252, outer or front end 253, front edge 253A, nose 264, contact surface 264A, outer surface 254, inner surface 255, inner or lower edge 256, outer or upper edge 257, bend 260, rear and front extremities 261 and 262, and fastener openings 275. As seen in FIGS. 21 and 22, flight 204 includes vane 220 having inner edge 221, outer edge 222, leading extremity 223, trailing extremity 224, outer face 225, inner face 226, leading edge 230, prominence 231, and fastener openings 270. In this embodiment, fastener openings 275 are elongate and are parallel relative to inner or rear end 252, outer or front end 253, including front edge 253A, and when wear plate 202' is installed onto flight 204 fastener openings 275 are, according to the principle of the invention, parallel with respect to leading edge 230 of leading extremity and are oblique with respect to fastener openings 270.

As discussed above, fastener openings 275 of wear plate 202 correspond to and align with fastener openings 270 of vane 220, which concurrently receive releasable fasteners in the nature of nut-and-bolt assemblies to releasably secure wear plate 202 to vane 220. Fastener openings 275 formed in wear plate 202 correspond to fastener openings 270 formed in vane 220 as before, such that when aligned and fitted with the releasable fasteners releasably connecting/affixing wear plate 202 to vane 220 produce the specific positioning of wear plate 202 relative to vane 220 detailed above and which is summarized below in conjunction with FIGS. 21 and 22.

In the application of wear plate 202' onto vane 220 of flight 204, outer surface 254 of rear extremity 261 of body 251 of wear plate 202 near inner end 252 of wear plate 202 extending between bend 260 and inner end 252 of body 251 of wear plate 202 is positioned alongside of and against so as to be in contact with inner face 226 of vane 220 of flight 204 near leading extremity 223 and leading edge 230 of vane 220 of flight 204. Wear plate 202 body 251 is positioned such that inner and outer ends 252 and 253 and bend 260 are parallel with respect to leading edge 230 of leading extremity 223 of vane 220, and outer surface 254 of rear extremity 261 of wear plate 202 extends downwardly along inner face 226 of vane 220 from inner end 252 of wear plate 202 to bend 260 at leading edge 230 of leading extremity 224 of vane 220. Bend 260 is located under leading extremity 223 edge 230 of leading extremity 223 of vane 220. And so with wear plate 202 positioned or otherwise oriented as in FIGS. 21 and 22 such that inner and outer ends 252 and 253 and bend 260 of wear plate 202 are parallel with respect to leading edge 230 of leading extremity 223 of vane 220, body 251 of wear plate 202 thus extends along the length of leading edge 230 of leading extremity 223 of vane 220 from outer edge 257 of wear plate 202 at outer edge 221 of flight 204 to inner edge 256 of wear plate 202 at inner end 232 of prominence 231. Front extremity 262 extends forwardly of leading edge 230 of flight 204 to front edge 253A so as to shield leading edge 230 of flight 204 from impacting cuttings and for deflecting cuttings as previously described. Contact surface 64A of nose 64 is, in turn, in direct contact against contact surface 237 of jut 235, and forward edge 239 of prominence 231 and front edge 253A of wear plate 202 converge at tip 236 of jut 235 and nose 264 of wear plate 202, respectively, where the nose 264 and the jut 235 intersect. According to the described positioning of wear plate 202 relative to and along leading extremity 223 of vane 220 of flight 204, wear plate 202 extends across leading extremity 223 of vane 220 across the length of leading edge 230 and leading extremity 223 of vane 220 of flight 204 from outer edge 222 of flight 204 to inner end 232 of prominence 231, and front extremity 262 of body 251 of wear plate 202 extends forward away from bend 260 of body 251 of wear plate 202 and leading edge 230 of leading extremity 223 of vane 220 of flight 220 to outer end 253 of body 251 of wear plate 202 terminating distally with front edge 253A, and contact surface 64A of nose 264 is in direct contact against contact surface 237 of jut 235, whereby forward edge 239 of prominence 231 and front edge 253A of wear plate 202 converge at tip 236 of jut 235 and nose 264 of wear plate 202, respectively, where the nose 264 and the jut 235 intersect. This installation of wear plate 202 locates wear plate 202 in the shielding relationship.

As discussed above, fastener openings 270 through vane 220 are elongate in the direction of double arrowed line D, which direction is parallel relative to contact surface 237 of jut 25, which again allows wear plate 202 to be adjusted in reciprocal directions in the directions of double arrowed line D so as to bring front edge 253A front edge 253A of wear plate 202 into alignment with forward edge 239 of prominence 251. Again, the parallel relationship between contact surface 237 of jut 235 of fastener openings 270 ensures that contact surface 264A of nose 264 remains in contact against contact surface 237 of jut 235 during the adjustment of wear plate 202 in reciprocal directions along double arrowed line D relative to leading extremity 223 of vane 220. In wear plate 202', fastener openings 275 are each elongate in the direction of double arrowed line F in FIGS. 19-22, which is parallel relative to inner and outer ends 253 and 254, including front edge 253A, which is parallel relative to leading edge 230 of leading extremity 223 of vane 220, and which is oblique relative to the direction of fastener openings 270, namely, the direction of double arrowed line D. Because fastener openings 270 of flight 204 are each elongate in a first direction indicated by double arrowed line D, and fastener openings 275 of wear plate 202' are each elongate in a second direction different indicated by double arrowed line F being different from the direction of elongate fasteners 270 indicated by double arrowed line D, this permits adjustment of the wear plate in multiple directions, namely, the reciprocal directions of double arrowed line D to position wear plate 202' so as to adjust wear plate 202' as needed in order to bring front edge 253A into alignment with forward edge 239 of prominence 231, and the reciprocal directions of double arrowed line F relative to jut 235 in order to bring contact surface 264A of nose 264 into direct contact with contact surface 237 of jut 235.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A helical auger flight, comprising: a leading extremity, a trailing extremity, inner and outer edges that extend between the leading and trailing extremities, an inner face, and an outer face, the leading extremity includes a leading edge and a prominence having an inner end and an outer end, the leading edge extends from the outer edge of the helical auger flight to the inner end of the prominence, the prominence extends outward from the leading edge of the leading extremity from the inner end to the outer end, and the outer end has an upturned jut having a contact surface that that faces inwardly toward the leading edge.

2. The helical auger flight according to claim 1, wherein the upturned jut terminates distally at a tip.

3. The helical auger flight according to claim 2, wherein the contact surface extends between the outer end of the prominence and the tip.

4. The helical auger flight according to claim 3, wherein the prominence further includes a forward edge that extends between the inner edge of the helical auger flight and the tip.

* * * * *